United States Patent
Lim et al.

(10) Patent No.: US 11,245,948 B2
(45) Date of Patent: Feb. 8, 2022

(54) CONTENT PLAYBACK METHOD AND ELECTRONIC DEVICE SUPPORTING SAME

(71) Applicant: SAMSUNG ELECTRONICS CO., LTD., Suwon-si (KR)

(72) Inventors: Jun-Hak Lim, Suwon-si (KR); Hyuk Kang, Yongin-si (KR); Taeho Kim, Cheongju-si (KR); Taegun Park, Hwaseong-si (KR); Gyu-Cheol Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 38 days.

(21) Appl. No.: 16/331,696

(22) PCT Filed: Aug. 29, 2017

(86) PCT No.: PCT/KR2017/009400
§ 371 (c)(1),
(2) Date: Mar. 8, 2019

(87) PCT Pub. No.: WO2018/048130
PCT Pub. Date: Mar. 15, 2018

(65) Prior Publication Data
US 2019/0246161 A1     Aug. 8, 2019

(30) Foreign Application Priority Data
Sep. 8, 2016 (KR) .................. 10-2016-0115505

(51) Int. Cl.
*H04N 21/41* (2011.01)
*G06F 1/16* (2006.01)
(Continued)

(52) U.S. Cl.
CPC ............ *H04N 21/4104* (2013.01); *G06F 1/16* (2013.01); *G06Q 50/10* (2013.01); *G06T 19/00* (2013.01);
(Continued)

(58) Field of Classification Search
CPC ........... H04N 21/4104; H04N 21/2387; H04N 21/2407; H04N 21/436; H04N 21/43615;
(Continued)

(56) References Cited

U.S. PATENT DOCUMENTS

2009/0048693 A1    2/2009   Kato et al.
2012/0135784 A1*   5/2012   Lee .................... G06K 9/00624
                                                    455/556.1
(Continued)

FOREIGN PATENT DOCUMENTS

JP           5272409       8/2013
KR    10-2009-0022613    3/2009
(Continued)

OTHER PUBLICATIONS

International Search Report for PCT/KR2017/009400 dated Dec. 8, 2017, 4 pages.
(Continued)

*Primary Examiner* — Amare Mengistu
*Assistant Examiner* — Gloryvid Figueroa-Gibson
(74) *Attorney, Agent, or Firm* — Nixon & Vanderhye, P.C.

(57) ABSTRACT

An electronic device according to various embodiments of the present invention comprises: a sensor module functionally connected with the electronic device; a receiving module functionally connected with the electronic device; and a processor, wherein the processor may detect that the electronic device is worn by a user, obtain content from an external electronic device in response to the detection, and
(Continued)

execute the obtained content upon obtaining the content from the external electronic device.

5 Claims, 14 Drawing Sheets

(51) Int. Cl.
*G06T 19/00* (2011.01)
*G06Q 50/10* (2012.01)
*H04N 21/4363* (2011.01)
*H04N 21/436* (2011.01)
*H04N 21/2387* (2011.01)
*H04N 21/24* (2011.01)

(52) U.S. Cl.
CPC ..... *H04N 21/2387* (2013.01); *H04N 21/2407* (2013.01); *H04N 21/436* (2013.01); *H04N 21/4363* (2013.01); *H04N 21/43615* (2013.01)

(58) Field of Classification Search
CPC ...... H04N 21/4363; G06F 1/16; G06Q 50/10; G06T 19/00
USPC ............................................................ 345/8
See application file for complete search history.

(56) References Cited

U.S. PATENT DOCUMENTS

| | | | |
|---|---|---|---|
| 2015/0009096 A1* | 1/2015 | Lee .......................... | G06F 1/163 345/2.2 |
| 2015/0215443 A1* | 7/2015 | Heo ........................ | A61B 5/681 455/556.1 |
| 2015/0350296 A1* | 12/2015 | Yang ...................... | G06F 9/4856 715/740 |
| 2017/0139669 A1* | 5/2017 | Oh ........................... | H04R 3/12 |

FOREIGN PATENT DOCUMENTS

| | | |
|---|---|---|
| KR | 10-2010-0106038 | 10/2010 |
| KR | 10-2012-0057942 | 6/2012 |
| KR | 10-2015-0006195 | 1/2015 |
| KR | 10-2015-0088599 | 8/2015 |
| KR | 10-2015-0095124 | 8/2015 |
| KR | 10-2016-0000330 | 1/2016 |

OTHER PUBLICATIONS

Written Opinion of ISA for PCT/KR2017/009400 dated Dec. 8, 2017, 23 pages, with English Translation.

* cited by examiner

CONTENT PLAYBACK METHOD AND ELECTRONIC DEVICE SUPPORTING SAME

This application is the U.S. national phase of International Application No. PCT/KR2017/009400 filed Aug. 29, 2017 which designated the U.S. and claims priority to KR Patent Application No. 10-2016-0115505 filed Sep. 8, 2016, the entire contents of each of which are hereby incorporated by reference.

TECHNICAL FIELD

Various embodiments of the disclosure relate to a content playback method and an electronic device supporting the same.

DESCRIPTION OF RELATED ART

Recently, various electronic devices of a type directly wearable on the body are being developed. These wearable electronic devices can include, for example, a head-mounted display (HMD), a smart glass, a smart watch, a smart wristband, a contact lens type device, a ring type device, a shoe type device, a clothing type device, a glove type device, etc. These wearable electronic devices are directly worn on the body or clothes and thus, can rapidly improve portability and user's accessibility, and can provide a realistic image to users.

The conventional head-mounted display is inconvenient in a method of searching and connecting an external electronic device to transmit and/or receive content, and must go through several steps in order to execute the content, and is difficult for a user to input because of a characteristic of a user interface provided by a virtual reality.

SUMMARY

Various embodiments of the disclosure relate to a method for, as a head-mounted display is worn, continuously executing, by the head-mounted display, content which is being executed by an external electronic device, and an electronic device supporting the same.

Also, various embodiments of the disclosure relate to a method for, as a head-mounted display is worn, continuously coupling with a peripheral electronic device, and an electronic device supporting the same.

Technological solutions the disclosure seeks to achieve are not limited to the above-mentioned technological solutions, and other technological solutions not mentioned above would be able to be clearly understood by a person having ordinary skill in the art from the following statement.

A method according to various embodiments of the disclosure may include detecting that an electronic device is worn by a user, and in response to the detection, obtaining content from an external electronic device, and as obtaining the content from the external electronic device, executing the obtained content.

A method according to various embodiments of the disclosure may include detecting that an electronic device is worn by a user, searching a peripheral electronic device in response to the detection, storing state information of the searched peripheral electronic device, and coupling with the searched peripheral electronic device according to the state information.

A method according to various embodiments of the disclosure may include detecting that an electronic device is worn by a user, searching a peripheral electronic device in response to the detection, coupling with the searched peripheral electronic device, and as the electronic device executes a function related with the coupled peripheral electronic device, activating the coupled peripheral device.

An electronic device according to various embodiments of the disclosure may include a sensor module operatively coupled with the electronic device, a receiving module operatively coupled with the electronic device, and a processor. The processor may detect that an electronic device is worn by a user, and in response to the detection, obtain content from an external electronic device, and as obtaining the content from the external electronic device, execute the obtained content.

An electronic device according to various embodiments of the disclosure may include a sensor module operatively coupled with the electronic device, a memory, and a processor. The processor may detect that an electronic device is worn by a user, search a peripheral electronic device in response to the detection, store state information of the searched peripheral electronic device in the memory, and couple with the searched peripheral electronic device according to the state information.

An electronic device according to various embodiments of the disclosure may include a sensor module operatively coupled with the electronic device, and a processor. The processor may detect that an electronic device is worn by a user, search a peripheral electronic device in response to the detection, couple with the searched peripheral electronic device, and as the electronic device executes a function related with the coupled peripheral electronic device, activate the coupled peripheral device.

A content playback method and an electronic device supporting the same according to various embodiments of the disclosure can continuously play back content of an external electronic device on the basis of wearing of the electronic device. Accordingly, a convenience and device accessibility of a user who plays back content by a wearable device are enhanced.

DETAILED DESCRIPTION OF EXAMPLE EMBODIMENTS

Figure 1:
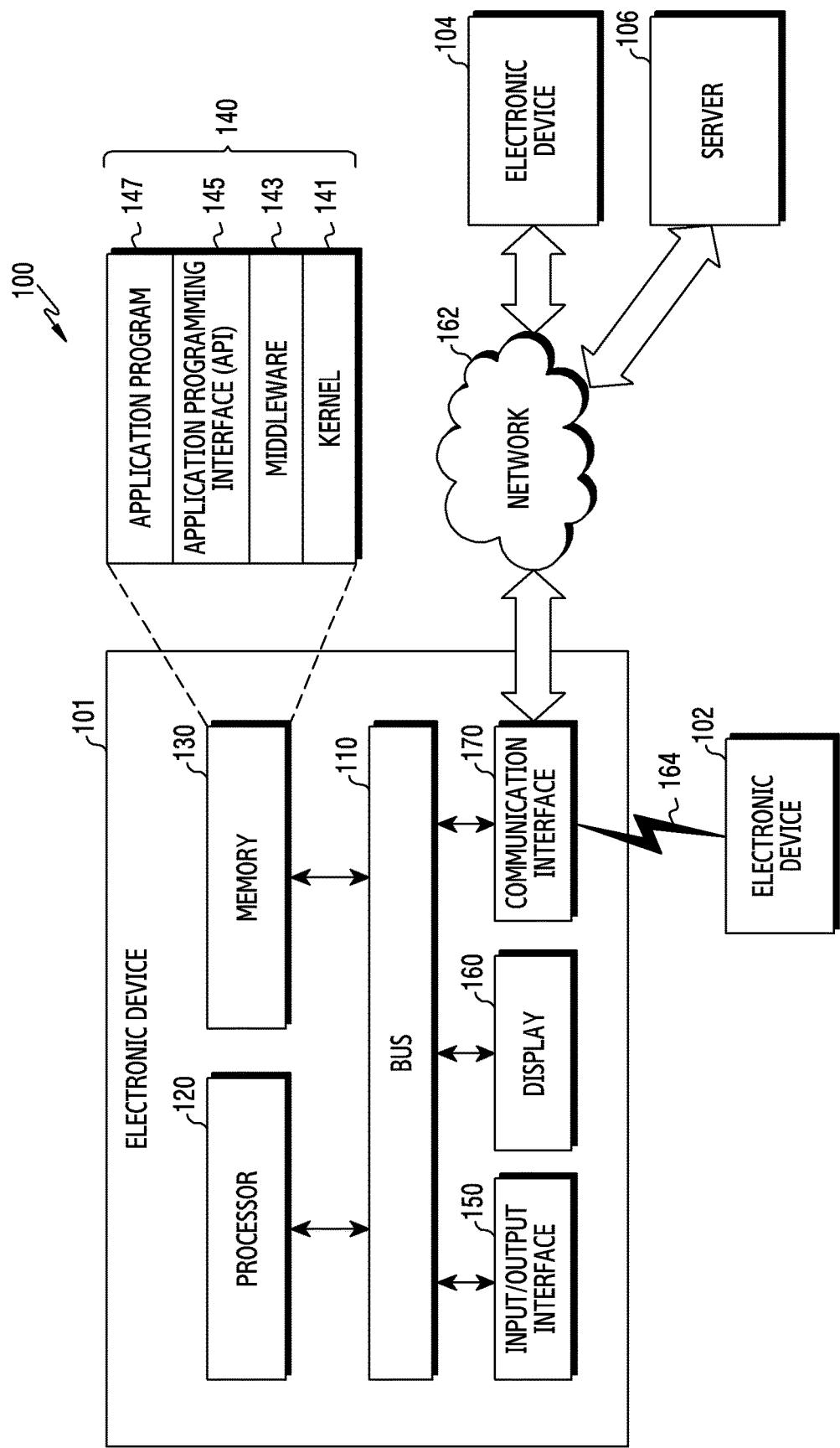
FIG. 1 illustrates an environment of a network including an electronic device according to various embodiments of the disclosure.

Hereinafter, various embodiments of the present disclosure will be described with reference to the accompanying drawings. It should be understood that the embodiments of the present disclosure and the terms used herein do not limit the present disclosure to the particular forms disclosed, and the present disclosure covers various modifications, equivalents, and/or alternatives of the corresponding embodiments. In describing the drawings, similar reference numerals may be used to designate similar elements. As used herein, the singular forms may include the plural forms as well, unless the context clearly indicates otherwise. In the present disclosure, the expressions "A or B" or "at least one of A and/or B" may include all possible combinations of the items listed. The expressions "a first", "a second", "the first", or "the second" may modify corresponding elements regardless of the order or the importance thereof, and is used only to distinguish one element from another element, but do not limit the corresponding elements. When an element (e.g., a first element) is referred to as being "(operatively or communicatively) coupled with/to" or "connected to" another element (e.g., a second element), the element may be directly coupled with/to or connected to the other element or an intervening element (e.g., a third element) may be present.

In the present disclosure, the expression "configured to" may be used interchangeably with the expressions "suitable for", "having the capacity to", "adapted to", "made to", "capable of", or "designed to" in terms of hardware or software, according to the circumstances. In some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a general-purpose processor (e.g., central processing unit (CPU) or application processor (AP)) that can perform the corresponding operations by executing one or more software programs stored in a memory device.

An electronic device according to various embodiments of the present disclosure, may include a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), an motion picture experts group (MPEG-1 or MPEG-2) audio layer-3 (MP3) player, a medical device, a camera, and a wearable device. The wearable device may include an accessory type (e.g., a watch, a ring, a bracelet, an anklet, a necklace, glasses, a contact lens, or a head-mounted device (HMD)), a fabric- or clothing-integrated type (e.g., an electronic clothing), a body-mounted type (e.g., a skin pad or tattoo), and a bio-implantable type (e.g., an implantable circuit). The electronic device may include a television (TV), a digital versatile disk (DVD) player, an audio player, a refrigerator, an air conditioner, a vacuum cleaner, an oven, a microwave oven, a washing machine, an air cleaner, a set-top box, a home automation control panel, a security control panel, a media box (e.g., Samsung Home-Sync™, Apple TV™, or Google TV™), a game console (e.g., Xbox™ and PlayStation™), an electronic dictionary, an electronic key, a camcorder, and an electronic photo frame.

According to an embodiment of the present disclosure, the electronic device may include various medical devices (e.g., portable medical measuring devices (e.g., a blood glucose monitoring device, a heart rate monitoring device, a blood pressure measuring device, a body temperature measuring device, etc.), a magnetic resonance angiography (MRA) device, a magnetic resonance imaging (MRI) device, a computed tomography (CT) machine, and an ultrasonic machine), a navigation device, a global navigation satellite system (GNSS), an event data recorder (EDR), a flight data recorder (FDR), a vehicle infotainment device, electronic devices for a ship (e.g., a navigation device, a gyro-compass, etc.), avionics, security devices, an automotive head unit, a robot for home or industry, a drone, an automated teller machine (ATM), a point of sales (POS) device, and an Internet of things (IoT) device (e.g., a light bulb, various sensors, a sprinkler device, a fire alarm, a thermostat, a streetlamp, a toaster, sporting goods, a hot water tank, a heater, a boiler, etc.). According to various embodiments of the present disclosure, the electronic device may include at least one of a part of a piece of furniture, a building/structure, a motor vehicle, an electronic board, an electronic signature receiving device, a projector, and various kinds of measurement instruments (e.g., a water meter, an electric meter, a gas meter, and a radio wave meter). The electronic device may be flexible, or may be a combination of two or more of the aforementioned devices. The electronic device is not limited to the aforementioned devices, and may include a new electronic device depending on technical progress. In the present disclosure, the term "user" may indicate a person using an electronic device or a device (e.g. an artificial intelligence (AI) electronic device) using an electronic device.

FIG. 1 illustrates a network environment 100 including an electronic device, according to various embodiments of the present disclosure.

Referring to FIG. 1, the electronic device 101 may include a bus 110, a processor 120, a memory 130, an input/output interface 150, a display 160, and a communication interface 170. According to various embodiments of the present disclosure, at least one of the above elements of the electronic device 101 may be omitted from the electronic device 101, or the electronic device 101 may additionally include other elements. The bus 110 may include a circuit that interconnects the elements 120 to 170 and delivers a communication (e.g., a control message or data) between the elements 120 to 170. The processor 120 may include one or more of a CPU, an AP, and a communication processor (CP). The processor 120 may perform calculations or data processing related to control over and/or communication by at least one of the other elements of the electronic device 101.

The memory 130 may include a volatile memory and/or a non-volatile memory. The memory 130 may store commands or data related to at least one of the other elements of the electronic device 101. According to an embodiment of the present disclosure, the memory 130 may store software and/or a program 140.

The program 140 may include a kernel 141, middleware 143, an application programming interface (API) 145, and/or an application 147. At least some of the kernel 141, the middleware 143, and the API 145 may be referred to as an operating system (OS). The kernel 141 may control or manage system resources (e.g., the bus 110, the processor 120, the memory 130, etc.) used to execute operations or functions implemented by the other programs (e.g., the middleware 143, the API 145, and the application 147). Also, the kernel 141 may provide an interface capable of controlling or managing the system resources by accessing the individual elements of the electronic device 101 by using the middleware 143, the API 145, or the application 147.

The middleware 143 may serve as an intermediary that enables the API 145 or the application 147 to communicate with the kernel 141 and to exchange data therewith. Also, the middleware 143 may process one or more task requests received from the application 147 according to a priority. The middleware 143 may assign a priority, which enables the use of system resources (e.g., the bus 110, the processor 120, the memory 130, etc.) of the electronic device 101, to at least one of the applications 147, and may process the one or more task requests according to the assigned priority. The API 145 is an interface through which the application 147 controls a function provided by the kernel 141 or the middleware 143, and may include at least one interface or function (e.g., instruction) for file control, window control, image processing, character control, etc. The input/output interface 150 may deliver a command or data, which is input from a user or an external device, to the element(s) other than the input/output interface 150 within the electronic device 101, or may output, to the user or an external device, commands, or data received from the element(s) other than the input/output interface 150 within the electronic device 101.

The display 160 may include a liquid crystal display (LCD), a light-emitting diode (LED) display, an organic light-emitting diode (OLED) display, a micro electro mechanical systems (MEMS) display, and an electronic paper display. The display 160 may display various pieces of content (e.g., text, images, videos, icons, symbols, etc.) to the user. The display 160 may include a touch screen, and may receive a touch input, a gesture input, a proximity input, or a hovering input provided by an electronic pen or a body part of the user.

The communication interface 170 may establish communication between the electronic device 101 and an external device (e.g., a first external electronic device 102, a second external electronic device 104, or a server 106). The communication interface 170 may be connected to a network 162 through wireless or wired communication, and may communicate with the external device.

The types of wireless communication may include, for example, cellular communication which uses long-term evolution (LTE), LTE-advanced (LTE-A), code division multiple access (CDMA), wideband CDMA (WCDMA), universal mobile telecommunications system (UMTS), WiBro (Wireless Broadband), and global system for mobile communications (GSM). According to an embodiment of the present disclosure, the types of wireless communication 164 may include wireless fidelity (Wi-Fi), light fidelity (Li-Fi), Bluetooth™, Bluetooth low energy (BLE), ZigBee, near field communication (NFC), magnetic secure transmission (MST), radio frequency (RF), and body area network (BAN). The types of wireless communication may include a GNSS. The GNSS may be a global positioning system (GPS), a global navigation satellite system (GLONASS), a Beidou navigation satellite system (Beidou), or the European global satellite-based navigation system (Galileo). Hereinafter, in the present disclosure, the term "GPS" may be used interchangeably with the term "GNSS."

The types of wired communication may include a universal serial bus (USB), a high definition multimedia interface (HDMI), recommended standard 232 (RS-232), power line communication (PLC), and a plain old telephone service (POTS). The network 162 may include telecommunication networks, such as a computer network (e.g., a local area network (LAN) or a wide area network (WAN)), the Internet, and a telephone network.

Each of the first and second external electronic devices 102 and 104 may be of a type identical to or different from that of the electronic device 101. According to various embodiments of the present disclosure, all or some of operations performed by the electronic device 101 may be performed by another electronic device or multiple electronic devices (e.g., the first and second external electronic devices 102 and 104, or the server 106). When the electronic device 101 needs to perform some functions or services automatically or by a request, the electronic device 101 may send, to another device, a request for performing at least some functions related to the functions or services, instead of performing the functions or services by itself, or additionally. Another electronic device may execute the requested functions or the additional functions, and may deliver a result of the execution to the electronic device 101. The electronic device 101 may process the received result without any change or additionally, and may provide the requested functions or services. To this end, cloud computing technology, distributed computing technology, or client-server computing technology.

Figure 2:
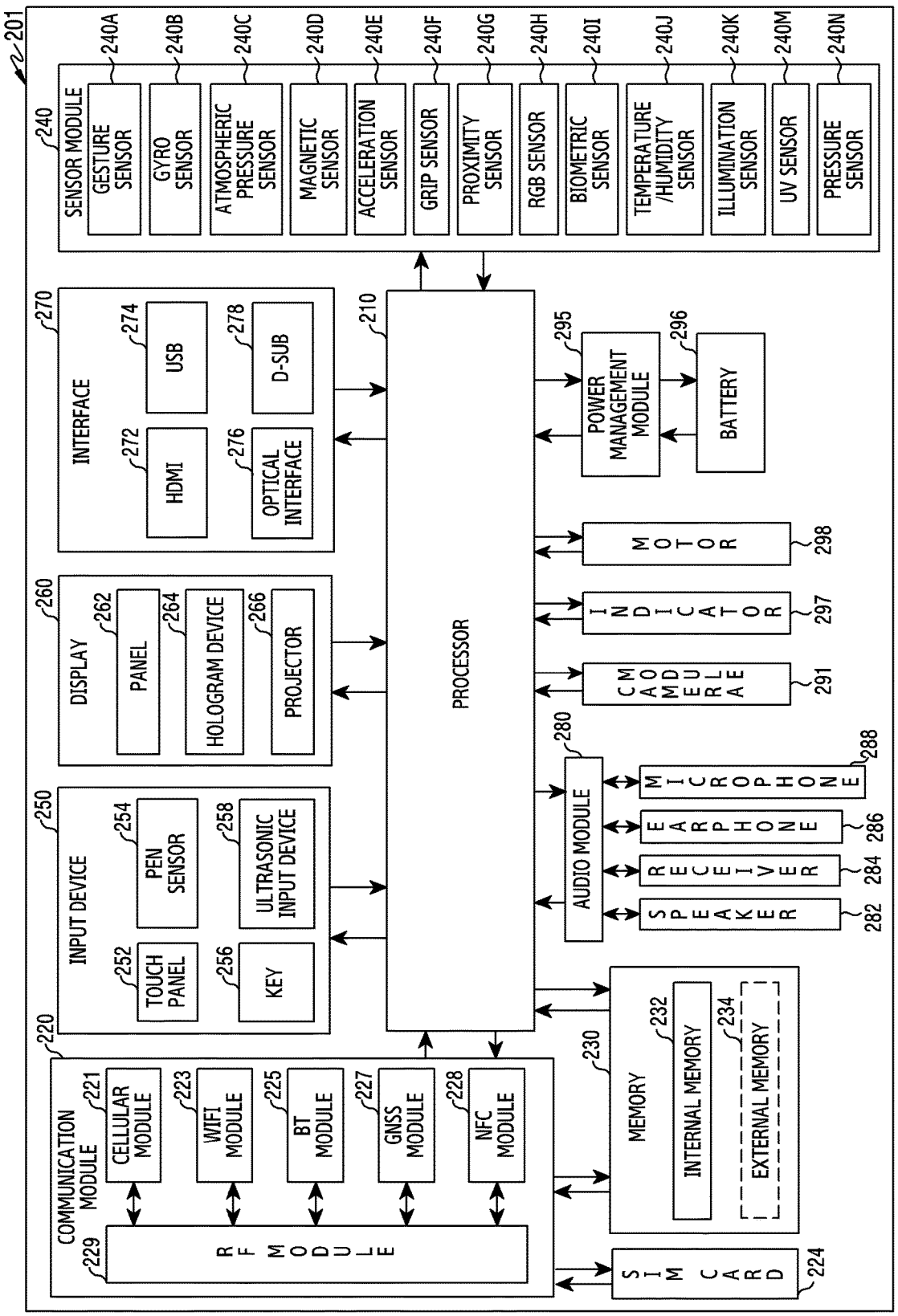
FIG. 2 illustrates a block diagram of an electronic device according to various embodiments of the disclosure.

FIG. 2 is a block diagram illustrating a configuration of an electronic device, according to various embodiments of the present disclosure.

According to various embodiments of the present disclosure, electronic device 201 may include all or a part of the electronic device 101. Referring to FIG. 2, the electronic device 201 may include one or more processors 210 (e.g., an AP), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an OS or an application program, and perform processing of various pieces of data and calculations. The processor 210 may be implemented as, for example, a system on chip (SoC). According to an embodiment of the present disclosure, the processor 210 may further include a graphic processing unit (GPU) and/or an image signal processor (ISP). The processor 210 may include a part (e.g., a cellular module 221) of the components of electronic device 201. The processor 210 may load, into a volatile memory, commands or data received from at least one (e.g., a non-volatile memory) of the other components and may process the loaded commands or data, and may store a variety of data in a non-volatile memory.

According to various embodiments of the present disclosure, the communication module 220 may, have a configuration equivalent or similar to that of the communication interface 170. The communication module 220 may include a cellular module 221, a Wi-Fi module 223, a Bluetooth (BT) module 225, a GNSS module 227 (e.g., a GPS module, a Glonass module, a Beidou module, or a Galileo module), an NFC module 228, and a RF module 229. The cellular module 221 may provide a voice call, a video call, a text message service, or an Internet service through a communication network. According to various embodiments of the present disclosure, the cellular module 221 may distinguish and authenticate the electronic device 201 in a communication network using the SIM 224 (e.g., the SIM card). The cellular module 221 may perform at least some of the functions that the processor 210 may provide. The cellular module 221 may include a CP. According to various embodiments of the present disclosure, each of the Wi-Fi module 223, the BT module 225, the GNSS module 227, and the NFC module 228 may include a processor for processing data transmitted/received through a corresponding module. At least some (e.g., two or more) of the cellular module 221, the Wi-Fi module 223, the BT module 225, the GNSS module 227, and the NFC module 228 may be included in one integrated circuit (IC) chip or IC package. The RF module 229 may transmit or receive a communication signal (e.g., an RF signal). The RF module 229 may include a transceiver, a power amplifier module (PAM), a frequency filter, a low noise amplifier (LNA), and an antenna. According to various embodiments of the present disclosure, one of the cellular module 221, the WI-FI module 223, the BT module 225, the GNSS module 227, and the NFC module 228 may transmit/receive an RF signal through a separate RF module. According to various embodiments of the present disclosure, SIM 224 may include a card including a SIM and/or an embedded SIM, and may contain unique identification information (e.g., an integrated circuit card identifier (ICCID)) or subscriber information (e.g., an international mobile subscriber identity (IMSI)).

The memory 230 may include an embedded memory 232 or an external memory 234. The embedded memory 232 may include a volatile memory (e.g., a dynamic random access memory (DRAM), a static RAM (SRAM), a synchronous dynamic RAM (SDRAM), etc.) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, a solid state drive (SSD), etc.). The external memory 234 may further include a flash drivesuch as a compact flash (CF), a secure digital (SD), a micro secure digital (Micro-SD), a mini secure digital (mini-SD), an eXtreme Digital (xD), a multi-media card (MMC), a memory stick, etc. The external memory 234 may be functionally and/or physically connected to the electronic device 201 through various interfaces.

According to various embodiments of the present disclosure, sensor module 240 may measure a physical quantity or detect an operation state of the electronic device 201, and may convert the measured or detected information into an electrical signal. The sensor module 240 may include a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor 240I (e.g., medical sensor), a temperature/humidity sensor 240J, an illuminance sensor 240K, and a ultra violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris scan sensor, and/or a finger scan sensor. The sensor module 240 may further include a control circuit for controlling one or more sensors included therein. The electronic device 201 may further include a processor configured to control the sensor module 240, as a part of the processor 210 or separately from the processor 210, and may control the sensor module 240 while the processor 210 is in a sleep state.

The input device 250 may include a touch panel 252, a (digital) pen sensor 254, a key 256, or an ultrasonic input device 258. The touch panel 252 may use one of a capacitive type, a resistive type, an infrared type, and an ultrasonic type. The touch panel 252 may further include a control circuit. The touch panel 252 may further include a tactile layer, and provide a tactile reaction to the user. The (digital) pen sensor 254 may include a recognition sheet which is a part of the touch panel or is separated from the touch panel. The key 256 may include a physical button, an optical key, or a keypad. The ultrasonic input device 258 may detect, through a microphone 288, ultrasonic waves generated by an input tool, and identify data corresponding to the detected ultrasonic waves.

The display 260 may include a panel 262, a hologram device 264, or a projector 266. The panel 262 may include a configuration identical or similar to the display 160. The panel 262 may be implemented to be flexible, transparent, or wearable. The panel 262 may be integrated as a single module with the touch panel 252. The hologram device 264 may show a three dimensional (3D) image in the air by using an interference of light. The projector 266 may project light onto a screen to display an image. The screen may be located in the interior of or on the exterior of the electronic device 201. According to an embodiment of the present disclosure, the display 260 may further include a control circuit for controlling the panel 262, the hologram device 264, or the projector 266. The interface 270 may include a high-definition multimedia interface (HDMI) 272, a USB 274, an optical interface 276, or a D-subminiature (D-sub) 278. The interface 270 may be included in the communication interface 170. Additionally or alternatively, the interface 270 may include a mobile high-definition link (MHL) interface, a SD card/MMC interface, or an Infrared Data Association (IrDA) standard interface.

The audio module 280 may convert a sound to an electrical signal and vice versa. At least some components of the audio module 280 may be included in the input/output interface 150. The audio module 280 may process voice information input or output through a speaker 282, a receiver 284, earphones 286, or the microphone 288. The camera module 291 is a device which may photograph a still image and a video. According to various embodiments of the present disclosure, the camera module 291 may include one or more image sensors (e.g., a front sensor or a back sensor), a lens, an ISP or a flash (e.g., LED or xenon lamp). The power management module 295 may manage power of the electronic device 201. According to an embodiment of the present disclosure, the power management module 295 may include a power management integrated circuit (PMIC), a charger IC, or a battery gauge. The PMIC may use a wired and/or wireless charging method. The wireless charging method may include a magnetic resonance method, a magnetic induction method, an electromagnetic wave method, etc. Additional circuits (e.g., a coil loop, a resonance circuit, a rectifier, etc.) for wireless charging may be further included. The battery gauge may measure a residual quantity of the battery 296, and a voltage, a current, or a temperature while charging. The battery 296 may include a rechargeable battery and/or a solar battery.

The indicator 297 may display a particular state (e.g., a booting state, a message state, a charging state, etc.) of the electronic device 201 or a part (e.g., the processor 210) of the electronic device 201. The motor 298 may convert an electrical signal into a mechanical vibration, and may generate a vibration, a haptic effect, etc. The electronic device 201 may include a processing device (e.g., a GPU) for supporting a mobile TV. The processing device for supporting a mobile TV may process media data according to a certain standard such as digital multimedia broadcasting (DMB), digital video broadcasting (DVB), or mediaFLO™. According to an embodiment of the present disclosure, each of the above-described component elements of hardware may be configured with one or more components, and the names of the corresponding component elements may vary based on the type of electronic device. The electronic device may include at least one of the above-described elements. Some of the above-described elements may be omitted from the electronic device, or the electronic device may further include additional elements. Also, some of the hardware components may be combined into one entity, which may perform functions identical to those of the relevant components before the combination.

Figure 3:
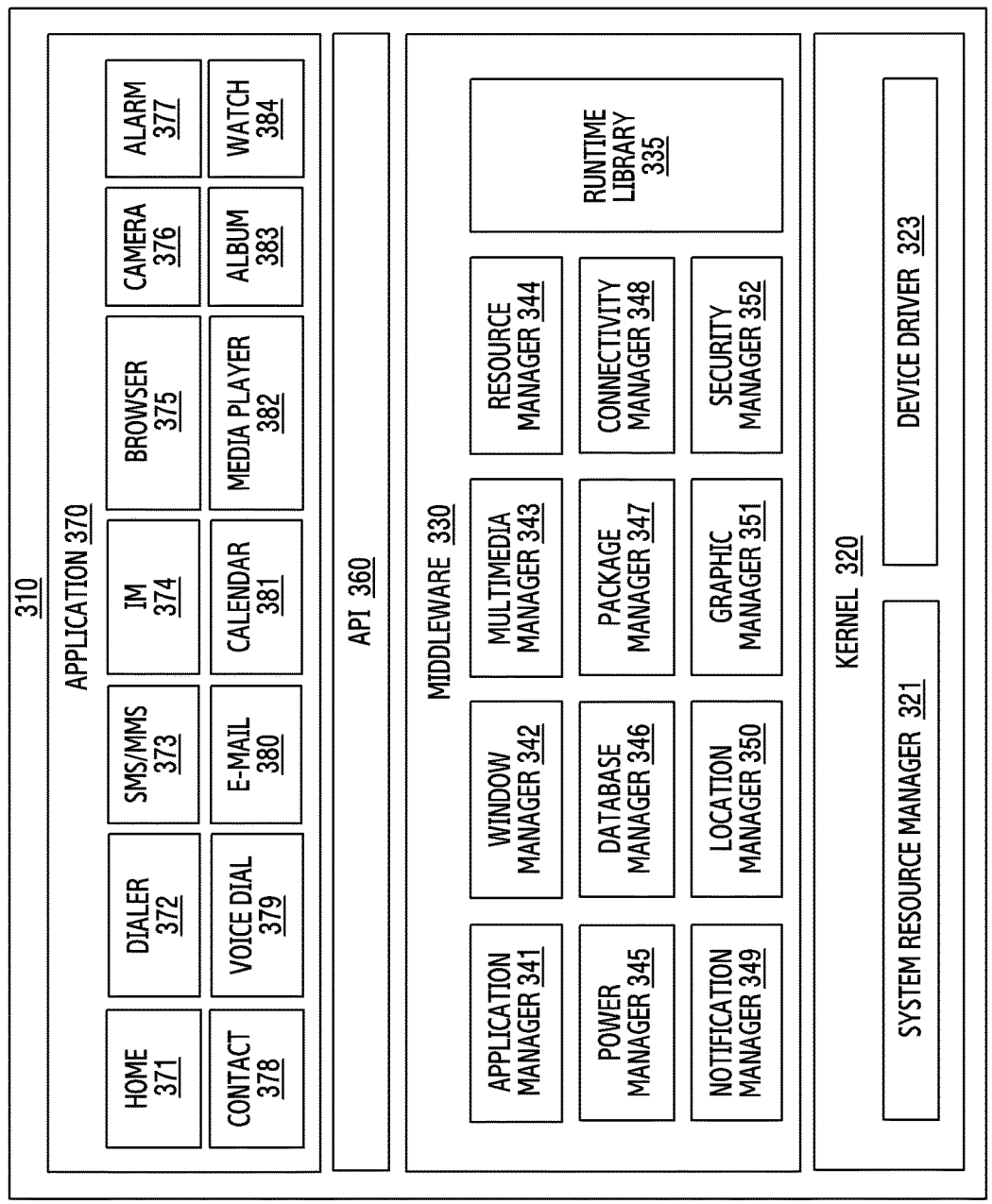
FIG. 3 is a block diagram of a program module according to various embodiments.

FIG. 3 is a block diagram illustrating a configuration of a program module, according to various embodiments of the present disclosure;

According to an embodiment of the present disclosure, the program module 310 may include an OS for controlling resources related to the electronic device 101 and/or applications 147 executed in the OS. The OS may comprise Android™ iOS™, Windows™, Symbian™, Tizen™, Bada™, etc. Referring to FIG. 3, the program module 310 may include a kernel 320, middleware 330, an API 360, and/or applications 370. According to various embodiments of the present disclosure, at least some of the program module 310 may be preloaded on an electronic device, or may be downloaded from an external electronic device (e.g., the electronic device 102 or 104, or the server 106).

The kernel 320 may include a system resource manager 321 and/or a device driver 323. The system resource manager 321 may control, allocate, or collect system resources. According to various embodiments of the present disclosure, the system resource manager 321 may include a process management unit, a memory management unit, a file system management unit, etc. The device driver 323 may include a display driver, a camera driver, a Bluetooth™ driver, a shared memory driver, a USB driver, a keypad driver, a Wi-Fi driver, an audio driver, or an inter-process communication (IPC) driver. The middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 may include a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

According to various embodiments of the present disclosure, runtime library 335 may include a library module which a compiler uses in order to add a new function through a programming language while an application 370 is being executed. The runtime library 335 may perform input/output management, memory management, the functionality for an arithmetic function, etc. According to various embodiments of the present disclosure, the application manager 341 may manage, a life cycle of the applications 370. The window manager 342 may manage the graphical user interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370. According to various embodiments of the present disclosure, power manager 345 may operate together with a basic input/output system (BIOS) or the like to manage a battery or power source, and may provide power information or the like required for the operations of the electronic device. The database manager 346 may generate, search for, and/or change a database to be used by at least one of the applications 370. The package manager 347 may manage installation or an update of an application distributed in a form of a package file.

The connectivity manager 348 may manage wireless connectivity such as Wi-Fi or Bluetooth. The notification manager 349 may display or notify of an event such as an arrival message, promise, proximity notification, etc. in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, etc. According to an embodiment of the present disclosure, when the electronic device 101 provides a telephone call function, the middleware 330 may further include a telephony manager for managing a voice call function or a video call function of the electronic device. According to various embodiments of the present disclosure, middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components. The API 360 includes a set of API programming functions, and may be provided with a different configuration according to an OS. In the case of Android or iOS, one API set may be provided for each platform. In the case of Tizen, two or more API sets may be provided for each platform.

The applications 370 may include one or more applications which provide functions such as a home 371 application, a dialer 372 application, an SMS/MMS 373 application, an instant message (IM) 374 application, a browser 375 application, a camera 376 application, an alarm 377 application, a contacts 378 application, a voice dial 379 application, an email 380 application, a calendar 381 application, a media player 382 application, an album 383 application, a watch 384 application, a healthcare application (e.g., measuring exercise quantity or blood sugar level), or an environment information application (e.g., providing atmospheric pressure, humidity, or temperature information). According to various embodiments of the present disclosure, applications 370 may include an information exchange application that can support the exchange of information between the electronic device and an external electronic device. The information exchange application may include a notification relay application for transferring specific information to an external electronic device or a device management application for managing an external electronic device. According to various embodiments of the present disclosure, the notification relay application may include a function of transferring, to the external electronic device, notification information generated from other applications of the electronic device 101 (e.g., an SMS/MMS application, an e-mail application, a health management application, or an environmental information application). Further, the notification relay application may receive notification information from an external electronic device and provide the received notification information to a user. According to various embodiments of the present disclosure, the device management application may manage (e.g., install, delete, or update) at least one function of an external electronic device communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service). According to various embodiments of the present disclosure, the applications 370 may include applications (e.g., a healthcare application of a mobile medical appliance or the like) designated according to an external electronic device. The applications 370 may include an application received from an external electronic device. The applications 370 may include a preloaded application or a third party application that may be downloaded from a server. The names of the components of the program module 310 may change depending on the type of OS. According to various embodiments of the present disclosure, at least a part of the programming module 310 may be implemented in software, firmware, hardware, or a combination of two or more thereof. At least some of the program module 310 may be implemented (e.g., executed) by the processor. At least some of the program module 310 may include a module, a program, a routine, a set of instructions, and/or a process for performing one or more functions.

A term "module" used in the present disclosure includes a unit consisting of hardware, software, or firmware, and may be interchangeably used with the terms "a unit", "a logic", "a logical block", "a component", "a circuit", etc. The term "module" may be an integrally constructed component or a minimum unit or one part thereof for performing one or more functions. The "module" may be mechanically or electrically implemented, and may include an application specific integrated circuit (ASIC) chip, field programmable gate arrays (FPGAs), or a programmable-logic device, which is known or is to be developed to perform certain operations. At least one part of an apparatus (e.g., modules or functions thereof) or method (e.g., operations) according to various embodiments of the present disclosure may be implemented with an instruction stored in a non-transitory computer-readable storage media. If the instruction is executed by one or more processors, the one or more processors may perform a function corresponding to the instruction. The computer-readable storage media may include a hard disk, a floppy disk, magnetic media (e.g., a magnetic tape), optical media (e.g., a compact disc-ROM (CD-ROM), a DVD, magnetic-optic media (e.g., a floptical disk)), an internal memory, etc. The instruction may include a code created by a compiler or a code executable by an interpreter. A module or program module according to various embodiments of the present disclosure may further include one or more of the aforementioned elements, or omit some, or further include another element. Operations carried out by a module, a program module, or another element according to various embodiments may be executed in a sequential, parallel, repeated, or heuristic manner, or at least some operations may be executed in different sequences or may be omitted, or another operation may be added.

An electronic device according to various embodiments of the disclosure may include a sensor module operatively coupled with the electronic device, a receiving module operatively coupled with the electronic device, and a processor. The processor may detect that the electronic device is worn by a user, and in response to the detection, obtain content from an external electronic device, and as obtaining the content from the external electronic device, execute the obtained content.

In an embodiment, the processor may activate a proximity sensor included in the sensor module operatively coupled with the electronic device, and detect, using the proximity sensor, that an electronic device is worn by the user.

In an embodiment, the processor may activate the receiving module in response to the detection, and receive a signal including content information from the external electronic device by using the receiving module.

In an embodiment, the receiving module may include at least one of an audio module, a camera module, and an RF module.

In an embodiment, the processor may identify whether virtual reality content is present in the content information, and in response to the virtual reality content being present in the content information, execute the virtual reality content, and in response to the virtual reality content not being present in the content information, convert the content into virtual reality content.

In an embodiment, the processor may identify whether the content is content streamed from a server.

In an embodiment, in response to the content being the content streamed from the server, the processor may execute the streamed content.

In an embodiment, the processor may obtain content that is being executed by the external electronic device.

An electronic device according to various embodiments of the disclosure may include a sensor module operatively coupled with the electronic device, a memory, and a processor. The processor may detect that an electronic device is worn by the user, search a peripheral electronic device in response to the detection, store state information of the searched peripheral electronic device in the memory, and couple with the searched peripheral electronic device according to the state information.

In an embodiment, the processor may activate a proximity sensor included in the sensor module operatively coupled with the electronic device, and detect, using the proximity sensor, that an electronic device is worn by the user.

In an embodiment, the processor may execute an application correspondingly to a user input, identify whether a peripheral electronic device related with the executed application is present, and in response to the peripheral electronic device related with the executed application being present, couple with the peripheral electronic device related with the executed application.

In an embodiment, the processor may identify whether the peripheral electronic device related with the executed application is present, on the basis of the state information.

In an embodiment, the processor may activate the peripheral device as the electronic device executes a function related with the peripheral electronic device.

An electronic device according to various embodiments of the disclosure may include a sensor module operatively coupled with the electronic device, and a processor. The processor may detect that the electronic device is worn by the user, search a peripheral electronic device in response to the detection, couple with the searched peripheral electronic device, and as the electronic device executes a function related with the coupled peripheral electronic device, activate the coupled peripheral device.

According to various embodiments of the disclosure, a computer recording medium executed by at least one processor, and storing a computer-readable instruction is provided. The instruction is configured to perform detecting that the electronic device is worn by the user, and in response to obtaining of the detection, obtaining content from an external electronic device, and as obtaining the content from the external electronic device, executing the obtained content.

Figure 4:
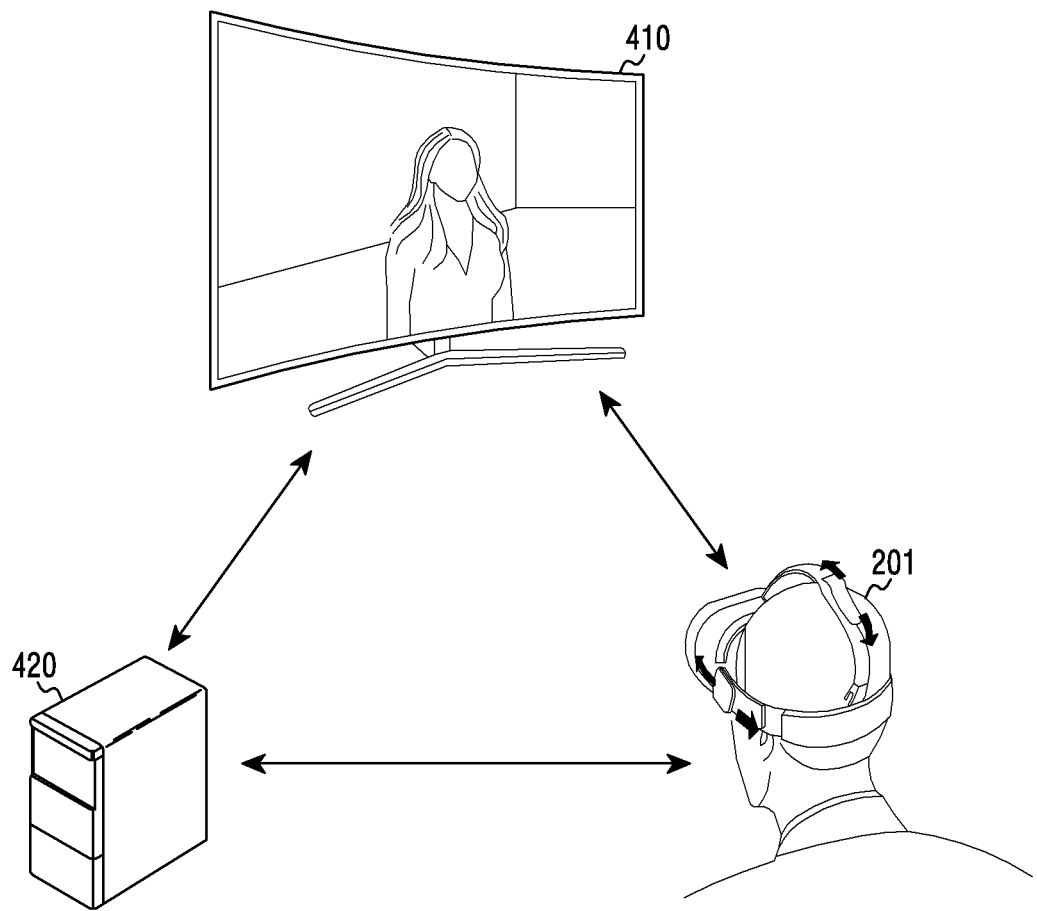
FIG. 4 is a conceptual diagram explaining a method for continuously playing back content according to various embodiments of the disclosure.

FIG. 4 is a conceptual diagram explaining a method for continuously playing back content according to various embodiments of the disclosure.

Referring to FIG. 4, an electronic device 201, an external electronic device 410, and a server 420 are illustrated. The electronic device 201 may transmit and/or receive with the external electronic device 410 to play back content, or transmit and/or receive with the external electronic device 410 and the server 420 to play back content. However, the technological spirit of the disclosure is not limited to this.

In an embodiment, the electronic device 201 may detect that an electronic device 201 is worn by the user through at least one sensor module 240 operatively coupled with the electronic device 201. In an embodiment, as illustrated in FIG. 4, a user may wear the head-mounted electronic device 201 on the head. Besides this, the electronic device 201 may be attached to the user's body in various forms according to the kind of the wearable device. For example, a smart glass may be worn on the head and, besides this, a smart band, a contact lens type device, a ring type device, a shoe type device, a clothing type device, a glove type device, etc. may be worn on the human body. However, the technological spirit of the disclosure is not limited to this. For description convenience's sake below, the electronic device 201 is explained on the premise that the electronic device 201 is a head-mounted electronic device.

In an embodiment, the electronic device 201 may detect that an electronic device 201 is worn by the user, using the proximity sensor 240G The proximity sensor 240G is a sensor for obtaining the approach of a target, and is a high frequency oscillation type, an electrostatic type, a magnetic type, a photoelectric type, an ultrasonic type, etc. according to the principle of obtaining.

In an embodiment, as detecting that an electronic device 201 is worn by the user, the electronic device 201 may activate the receiving module. In an embodiment, the receiving module may include at least one of the RF module 229, the audio module 280, and the camera module 291. The receiving module may be activated upon sensing the wearing of the electronic device 201, and may be activated by an external request or a user input. An operation concerning the receiving module of the electronic device 201 is described later in detail in FIG. 7.

In an embodiment, as detecting that an electronic device 201 is worn by the user, the electronic device 201 may receive a signal transmitted by the external electronic device 410. In an embodiment, the electronic device 201 may be a device for scanning the external electronic device 410, and the external electronic device 410 may be a device for advertising its own identification information, etc.

In an embodiment, the electronic device 201 may scan the external electronic device 410 by using at least one receiving module. That is, the electronic device 201 may scan the external electronic device 410, by receiving a signal transmitted by the external electronic device 410 and analyzing the received signal. For example, the electronic device 201 of an embodiment of the disclosure may receive advertising information broadcasted by the external electronic device 410. At this time, the electronic device 201 may analyze the advertising information, to identify identification information of the external electronic device 410, capability information on a communication scheme supported by the external electronic device 410, information on a preferred communication scheme, state information of the external electronic device 410, etc.

According to an embodiment of the disclosure, as the electronic device 201 powers on or detects that an electronic device 201 is worn by the user, the electronic device 201 may scan the external electronic device 410. For example, as the electronic device 201 powers on, the electronic device 201 may activate the receiving module, to receive the advertising information broadcasted by the external electronic device 410.

According to an embodiment of the disclosure, the electronic device 201 may include a seamless sensing platform (SSP).

According to an embodiment of the disclosure, the SSP may operate independently from the processor 210. For instance, the electronic device 201 may couple the sensor module 240 or the communication module 220 to a sensor hub of the SSP, to collect sensing information or scan the external electronic device 410 without waking up the processor 210 of a sleep mode, thereby recognizing the electronic device 201 and the circumstances of the electronic device 201.

In an embodiment, the external electronic device 410 may advertise (e.g., broadcast) information (for instance, identification information, capability information, state information, information on a preferred communication scheme, communication coupling information, etc.) on the external electronic device 410 and/or content information, through a plurality of communication schemes. At this time, the external device 410 may transmit information on content that is being executed by the external electronic device 410, to a peripheral device through short-range wireless communication. For instance, the external device 410 may broadcast information on the external electronic device 410, information on content that is being executed by the external electronic device 410, etc. through wireless communication such as BLE communication, ANT+ communication, short-range wireless communication (NFC), sound communication, Zigbee communication, WAVE, etc. At this time, the broadcasting may signify providing data to the external. That is, the broadcasting may include data providing, transmitting, displaying, outputting, etc.

In an embodiment, content may include multimedia works such as images, videos, sound sources, games, etc., various information or contents transmitted and/or received in both directions through a network, etc., digitalized information manufactured, sold and used through an information device, and the like. Also, in an embodiment, the content may include virtual reality content and augmented reality content. However, it is not limited to this. On the other hand, the virtual reality content means one of the kinds of three-dimensional content and thus, the virtual reality content and the three-dimensional content are mixedly used and mentioned as the same meaning.

In an embodiment, the sound communication means a communication scheme of transmitting and/or receiving data by using a sound. For example, the external electronic device 410 may insert data into a non-audible range of sound, or music or announcement, to broadcast to the external. Besides this, the external electronic device 410 may transmit and/or receive data by using visual information, and a data transmission and/or reception scheme is not limited to this.

In an embodiment, the external electronic device 410 may be various. That is, the external electronic device 410 may be a display device that includes a screen capable of playing back at least one content. For example, the external electronic device 410 described in the specification may be, but not limited to, a television, a portable phone, a smart phone, a laptop computer, a desktop personal computer (PC), a laptop PC, a tablet PC, an electronic book terminal, a digital broadcasting terminal, personal digital assistants (PDA), a portable multimedia player (PMP), a medical device, a digital camera, a smart TV, a set-top box, etc. Operation between the external electronic device 410 and the electronic device 201 is described later in detail in FIG. 9 and FIG. 10.

In an embodiment, as detecting that an electronic device 201 is worn by the user, the electronic device 201 may obtain content from the external electronic device 410. And, as obtaining the content from the external electronic device 410, the electronic device 201 may execute the obtained content. In detail, in an embodiment, in response to detecting that the electronic device 201 is worn by the user, the electronic device 201 may receive a signal including content information that is being executed by the external electronic device 410 and, after receiving the signal, the electronic device 201 may continuously execute the content that is being executed by the external electronic device 410. A content execution operation of the electronic device 201 is described later in detail with reference to FIG. 5 and FIG. 6.

On the other hand, in an embodiment, the server 420 may transmit streaming data to the external electronic device 410 or the electronic device 201. The electronic device 201 may receive content from the external electronic device 410 or receive from the server 420. Operation between the server 420 and the electronic device 201 is described later in detail in FIG. 8.

Figure 5:
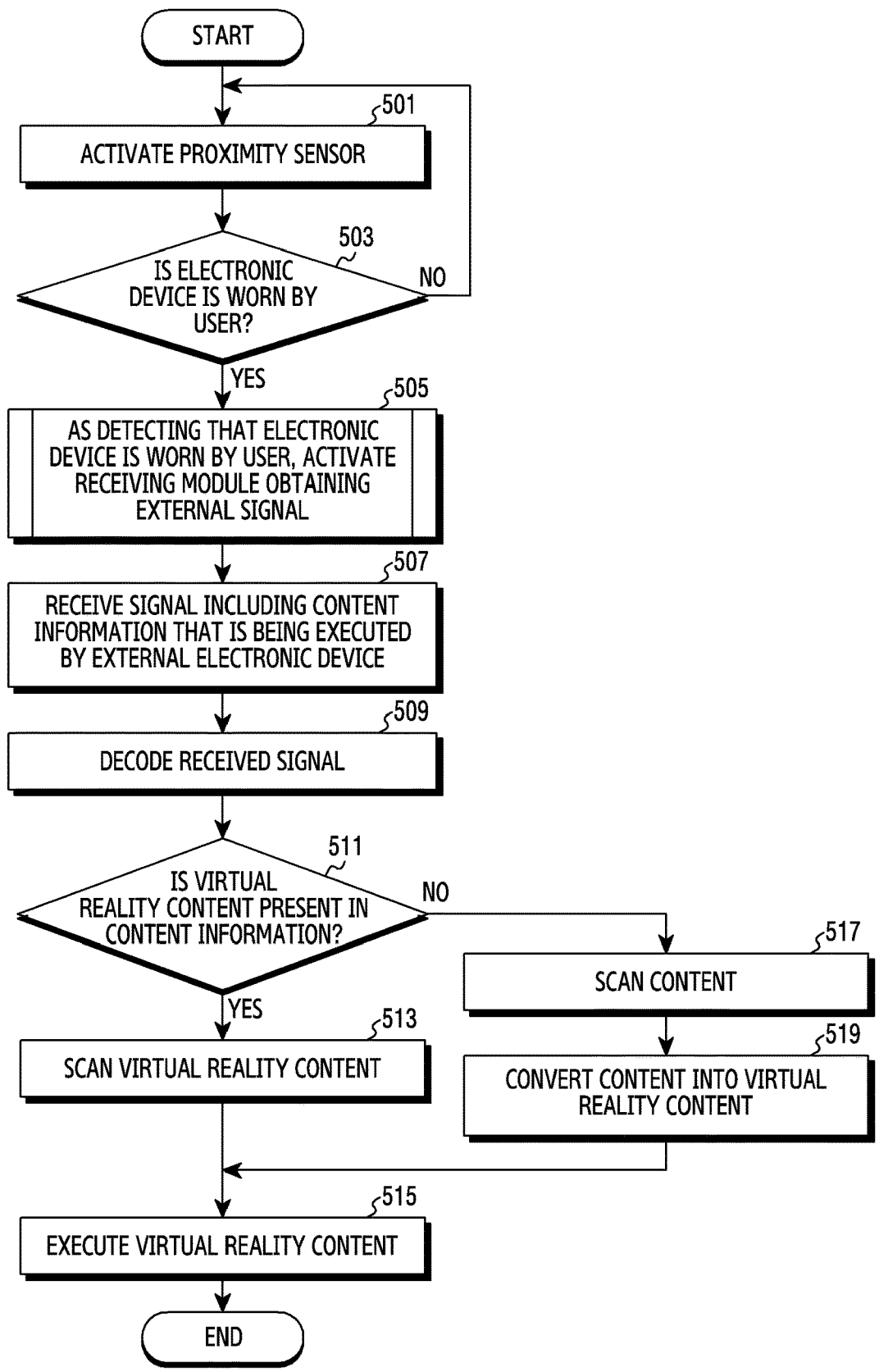
FIG. 5 is a flowchart explaining a method for continuously playing back content according to an embodiment of the disclosure.

FIG. 5 is a flowchart explaining a method for continuously playing back content according to an embodiment of the disclosure.

For description convenience's sake below, the electronic device 201 is explained on the premise that the electronic device 201 is a head-mounted electronic device. However, the electronic device 201 is not limited to this and may be a wearable device of another type. Also, the following description is made on the premise that virtual reality (VR) content and two-dimensional content are contents executable by the electronic device 201. For example, although not illustrated in the drawing, content transmitted by the external electronic device 410 may be content interchanged to be executable by the electronic device 201. Besides this, the electronic device 201 may include a conversion module for converting the content, wherein the transmitted content may be executed. However, it is not limited to this.

Referring to FIG. 5, in operation 501, in an embodiment, the processor 210 may activate at least one receiving module 240 electrically coupled to the electronic device 201, to obtain motion information of an object getting in proximity. For example, the processor 210 may activate at least one proximity sensor 240G electrically coupled to the electronic device 201, to obtain the motion information of the object getting in proximity.

In operation 503, in an embodiment, the processor 210 may determine whether the electronic device is worn by a user, through the proximity sensor 240G For example, the proximity sensor 240G may sense a series of actions in which a user's head gets in proximity and wears the electronic device 201.

In operation 505, in an embodiment, as detecting that the electronic device 201 is worn by the user, the processor 210 may activate a receiving module for obtaining an external signal. In an embodiment, the receiving module may include at least one of the RF module 229, the audio module 280, and the camera module 291. The receiving module may be activated upon detecting that the electronic device 201 is worn by the user, and may be activated based on a user input. Operation concerning the receiving module of the electronic device 201 is described later in detail in FIG. 7.

In operation 507, in an embodiment, the processor 210 receives a signal transmitted by the external electronic device 410 through the receiving module. In an embodiment, the signal may be a broadcast signal transmitted by the external electronic device 410. In an embodiment, the signal may include information corresponding to content that is being executed by the external electronic device 410. The information corresponding to the content may include information such as an image, a video, a sound source, a game, etc. and, beside this, may include virtual reality content and augmented reality content information. In an embodiment, as detecting that the electronic device 201 is worn by the user, the processor 210 may receive a signal.

In operation 509, in an embodiment, the processor 210 decodes the received signal. In an embodiment, in response to data being insufficient to recognize the content as a result of analyzing the decoded signal, the processor 210 may send a request for additional data to the external electronic device 410 through the communication module 220. In response to sending the additional data request, the electronic device 201 may form a channel with the external electronic device 410, and may receive the additional data.

In operation 511, in an embodiment, the processor 210 may identify whether at least one virtual reality content is present in the content information. The head-mounted electronic device is a device specialized for playing back the virtual reality content, and the processor 210 may obtain whether the virtual reality content is present in the received content information.

In operation 513, in an embodiment, in response to the virtual reality content being present in the content information, the processor 210 may scan at least one virtual reality content.

In operation 515, in an embodiment, the processor 210 may execute the scanned virtual reality content. In an embodiment, the processor 210 may execute the virtual reality content related with the content that is being executed by the external electronic device 410. In an embodiment, the virtual reality content may be link content included in the content that is being executed by the external electronic device 410. For example, in response to football image content that is being executed by the external electronic device 410 including a football highlight image consisting of virtual reality content, the football highlight image may be scanned as the virtual reality content. Besides this, the virtual reality content that is being executed by the external electronic device 410 may be scanned. However, it is not limited to this.

In operation 517, in an embodiment, in response to the virtual reality content not being present in the content information, the processor 210 may scan at least one content. Though not illustrated in the drawing, in an embodiment, in response to the content not being scanned, the electronic device 201 is terminated, or the processor 210 may display a main menu, etc.

In operation 519, in an embodiment, in response to the content being scanned, the processor 210 may convert the content into virtual reality content. For example, the processor 210 may convert two-dimensional content into the virtual reality content. In an embodiment, though not illustrated in the drawing, the electronic device 201 may include a virtual reality content conversion module. The virtual reality content conversion module may convert the content into the virtual reality content (three-dimensional content).

In an embodiment, the virtual reality content (three-dimensional content) conversion module grants a sense of depth to a two-dimensional image, to provide a three-dimensional image. The virtual reality content conversion module splits a frame of video data of the two-dimensional image into a block of a specific size, and selects a block being most similar with a specific block of a current frame among blocks of previous frames. The virtual reality content conversion module obtains a motion vector by split block of the current frame, and synthesizes the selected blocks, to provide a new frame. But, the disclosure is not limited to this, and the virtual reality content conversion module may use composition information of a frame to provide a depth map, wherein a sense of depth is granted to an image, and use this to provide a new frame as well.

In an embodiment, the virtual reality content conversion module identifies any one of a new frame and a current frame as a left eye image and identifies the remnant frame as a right eye image, or uses the new frame and the current frame to newly provide the left eye image and the right eye image. The virtual reality content conversion module provides a frame of a three-dimensional format, wherein the left and right images are all included in one frame, and sends this to the display 260. The display 260 outputs the left eye and right eye images included in a frame whose brightness is compensated, alternately by the unit of 1/120 seconds. However, the virtual reality content conversion module is not limited to this, and may use various methods to convert content into virtual reality content.

In operation 515, the processor 210 may execute the converted virtual reality content.

On the other hand, in an embodiment, in response to virtual reality content being content stored in the external electronic device 410, the processor 210 may use received content information to play back the virtual reality content. Unlike this, in response to the virtual reality content being provided from the server 420 to the external electronic device 410 in real time in a streaming scheme, the processor 210 may transmit a streaming data request signal to the server 420, and the server 420 receiving the request signal may real-time provide the virtual reality content to the electronic device 201 in the streaming scheme.

On the other hand, the processor 210 may detect that the electronic device 201 is worn by the user and, upon detecting that the electronic device 201 is worn by the user, the processor 210 may continuously execute a receiving module activating operation, an external signal receiving operation, a received signal decoding operation, a virtual reality content scanning operation, a virtual reality content converting operation, and a virtual reality content executing operation. That is, in operation disclosed in FIG. 5, as a user wears the electronic device 201, virtual reality content associated with content that is being executed by the external electronic device 410 may be continuously executed. Accordingly, by only an operation of wearing the electronic device 201, the user may simply view the virtual reality content related with the content that is being executed by the external electronic device 410.

On the other hand, although not illustrated in the drawing, in another embodiment, the processor 210 may immediately execute content transmitted by the external electronic device 410, instead of identifying whether virtual reality content is included in content information. For example, in response to receiving only one piece of content from the external electronic device 410, the electronic device 201 may immediately play back the content. Besides this, in response to receiving a plurality of contents from the external electronic device 410, the electronic device 201 may selectively play back. For instance, the electronic device 201 may immediately play back the firstly transmitted content or the lastly transmitted content. According to an embodiment of the disclosure, the electronic device 201 may first play back at least one of the plurality of contents according to conditions of the electronic device 201, a priority preset by a user, a user's preference identified according to an accumulated user's content playback list, a content playback time, etc. However, content on the playback order and method may be set in various methods, and is not limited to the method.

Figure 6:
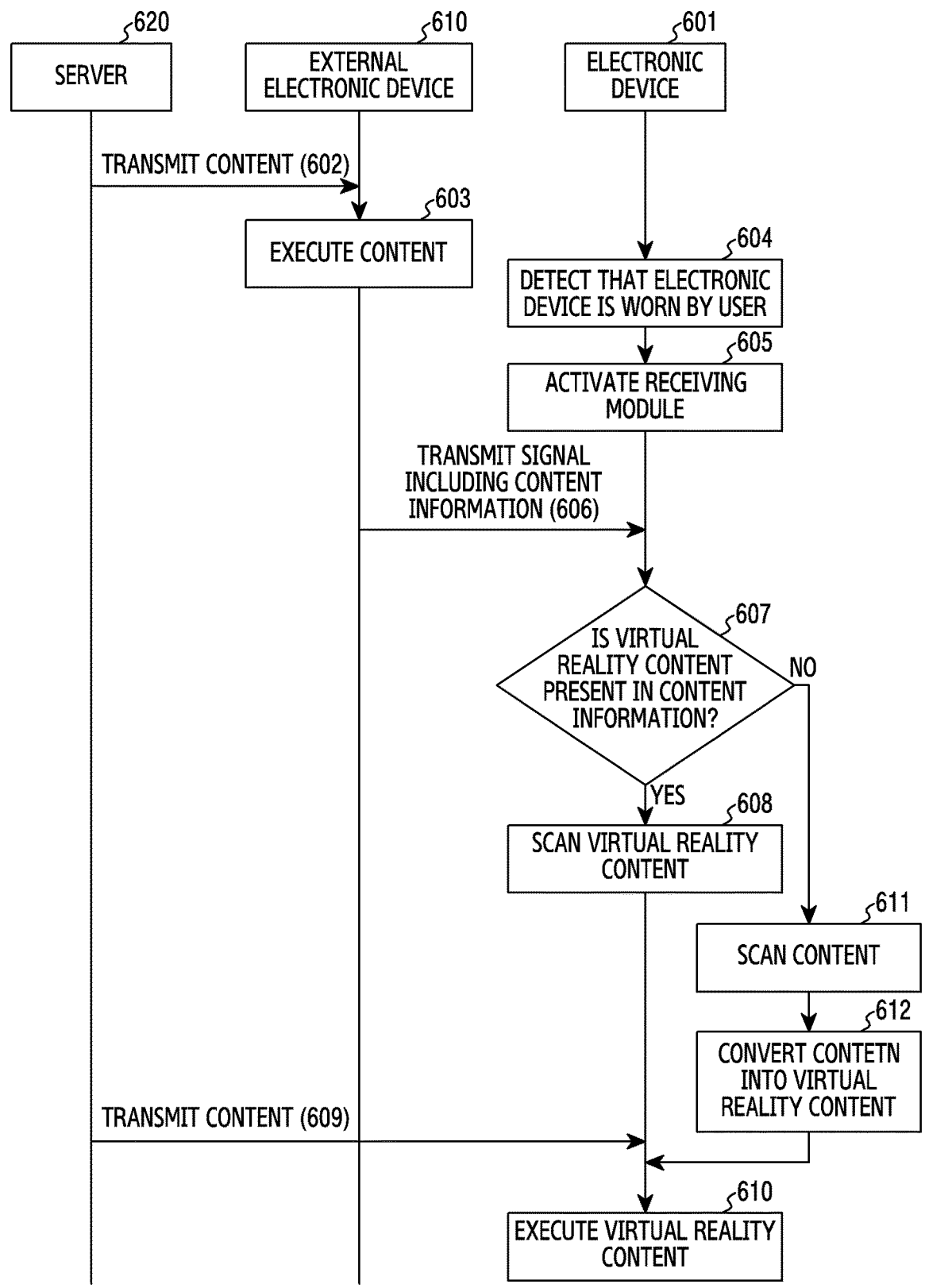
FIG. 6 is a flowchart explaining a system for continuously playing back content according to an embodiment of the disclosure.

FIG. 6 is a flowchart explaining a system for continuously playing back content according to an embodiment of the disclosure.

FIG. 6 is a diagram explaining together an operation relationship between an electronic device 601, an external electronic device 610, and a server 620. Referring to FIG. 6, the electronic device 601, the external electronic device 610, and the server 620 may be coupled through a network or a communication interface, respectively.

In operation 602, in an embodiment, the server 620 may transmit content to the external electronic device 610 through the network. For example, in an embodiment, the server 620 may stream the content in real time.

In operation 603, in an embodiment, the external electronic device 610 may execute the content transmitted by the server 620. For example, a user may be in course of viewing the content through the external electronic device 610. However, it is not limited to this.

In operation 604, in an embodiment, the electronic device 601 may detect that the electronic device 601 is worn by the user, using at least one sensor module 240 operatively coupled with the electronic device 601. For example, in course of viewing the content through the external electronic device 610, the user may recognize the presence of virtual reality content in the external electronic device 610, and the user may wear the electronic device 601, wherein the user views the virtual reality content. However, it is not limited to this.

In operation 605, in an embodiment, as detecting that the electronic device 601 is worn by the user, the electronic device 601 may activate the receiving module.

In operation 606, in an embodiment, the external electronic device 610 may transmit a signal including content information to the electronic device 601. The external electronic device 610 may broadcast the signal including the content information by periods, instead of transmitting the signal including the content information in any specific step.

In another embodiment, in response to a signal of requesting the content information, etc. being received from the electronic device 601, the external electronic device 610 may broadcast the signal including the content information to the electronic device 601.

In operation 607, in an embodiment, after decoding the received signal, the electronic device 601 may identify whether virtual reality content is present in the received content information.

In operation 608, in an embodiment, in response to the virtual reality content being present in the content information, the processor 210 may scan at least one virtual reality content.

In operation 609, in an embodiment, the server 620 streams the content scanned by the electronic device 601 according to a request of the electronic device 601. Because the virtual reality content has a huge data capacity, the server 620 may provide the content in a streaming scheme. For example, by using the received content information, the electronic device 601 may transmit, to the server 620, a signal of requesting the same content as the content received from the external electronic device 610. As receiving the signal, the server 620 may stream the content to the electronic device 601. In this case, the server 620 may continuously stream the content to the external electronic device 610 or stop the streaming.

In another embodiment, the external electronic device 610 may send the server 620 a signal of requesting to stream the content to the electronic device 601. Accordingly to this, the server 620 may provide the content to the electronic device 610.

In a further embodiment, the electronic device 601 may execute the content by only the content information received from the external electronic device 610, instead of receiving the content from the server 610. In a yet another embodiment, in response to the content being difficult to be executed by only the content information received from the external electronic device 610, the electronic device 601 may request additional data to the external electronic device 610.

In operation 611, in an embodiment, in response to the virtual reality content not being present, the electronic device 601 may perform the scanning of content.

In operation 612, in an embodiment, the processor 210 may perform an operation of converting the content into virtual reality content. For example, the processor 210 may perform an operation of converting two-dimensional content into virtual reality content.

In operation 610, in an embodiment, the electronic device 601 may execute the scanned virtual reality content or the converted virtual reality content. For example, upon the wearing of the electronic device 601, the user may continuously execute and view the content that is being executed by the external electronic device 610.

Figure 7:
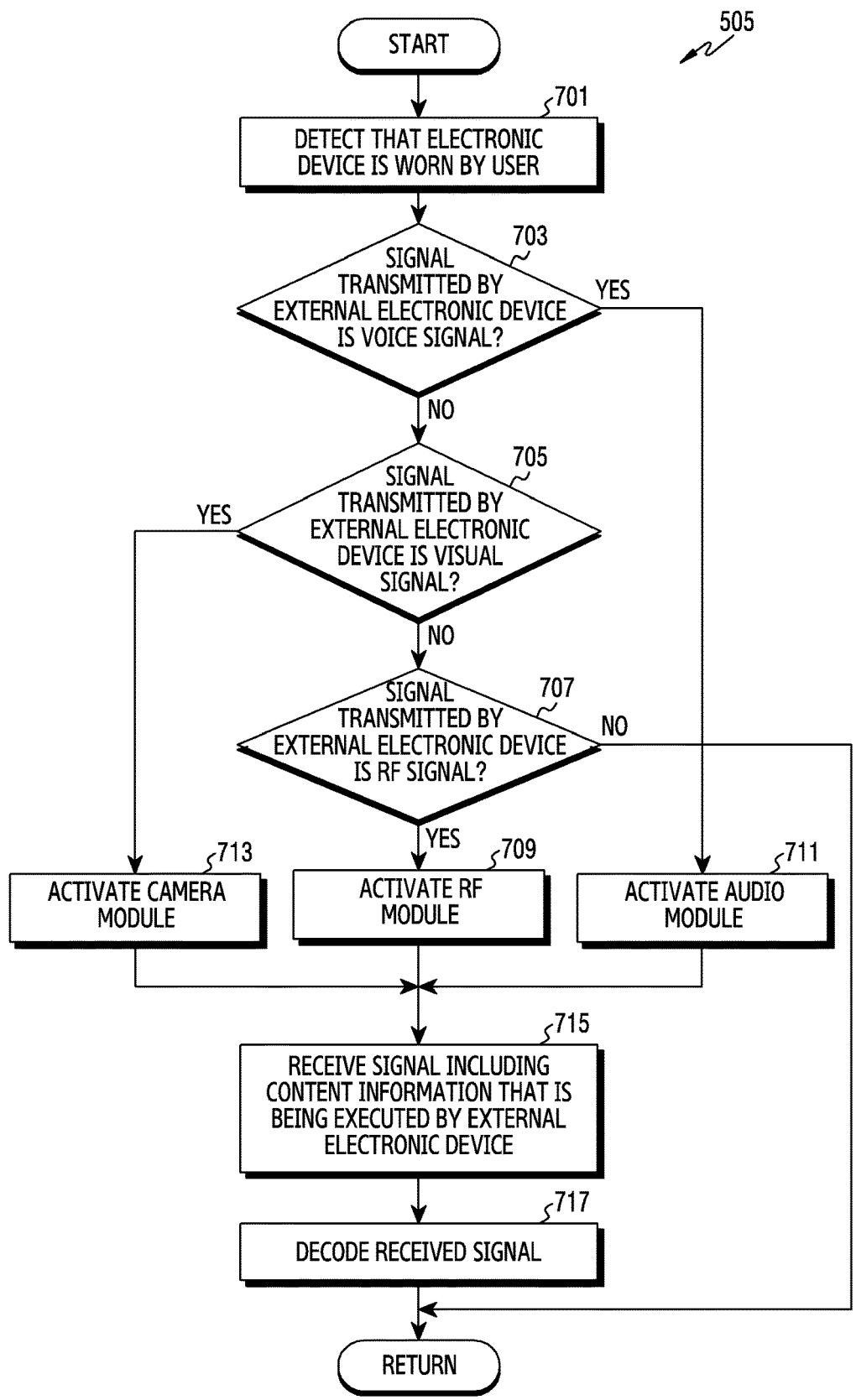
FIG. 7 is a flowchart explaining a method for activating a receiving module and receiving an external signal according to an embodiment of the disclosure.

FIG. 7 is a flowchart explaining a method for activating a receiving module and receiving an external signal according to an embodiment of the disclosure.

FIG. 7 is a flowchart explaining, in detail, an operation in which the electronic device 201 activates the receiving module according to the kind of a signal transmitted by the external electronic device 410. For description convenience's sake, operations 701, 715, and 717 of FIG. 7 are the same as operations 503, 507, and 509 of FIG. 5 and thus, a description thereof is omitted.

Referring to FIG. 7, in operations 703 and 711, in an embodiment, in response to a signal transmitted by the external electronic device 410 being a voice signal, the processor 120 may activate the audio module 280. By using at least one of a speaker, a receiver, an earphone, and a microphone, the audio module 280 may receive an external voice signal. The external electronic device 410 may insert data into a non-audible range of sound, or music or announcement, to broadcast a voice signal to the external. In an embodiment, as detecting that the electronic device 201 is worn by the user without a separate user input, the processor 210 may activate the audio module 280, to receive a voice signal. In another embodiment, as obtaining an input that a user activates at least one of the speaker 282, the receiver 284, the earphone 286 and the microphone 283, the processor 210 may receive an external voice signal.

In operations 705 and 713, in an embodiment, in response to the signal transmitted by the external electronic device 410 being a visual signal, the processor 120 may activate the camera module 291. The camera module 291 may receive an external visual signal. The external electronic device 410 may insert data into a non-audible range of a visual image or the image, to broadcast a visual signal to the external. In an embodiment, as detecting that the electronic device 201 is worn by the user, the processor 210 may activate the camera module 291, to receive a visual signal. According to an embodiment of the disclosure, as obtaining an input that the user activates the camera module 291, the processor 210 may receive an external visual signal.

In operations 707 and 709, in an embodiment, in response to the signal transmitted by the external electronic device 410 being an RF signal, the processor 120 may activate the RF module 229. The RF module 229 may receive an external wireless signal. The external electronic device 410 may broadcast a wireless signal to the external by using a plurality of communication schemes. In an embodiment, as detecting that the electronic device 201 is worn by the user, the processor 210 may activate the RF module 229, to receive a wireless signal. In another embodiment, as obtaining an input that the user activates the communication module 220, the processor 210 may receive an external wireless signal.

The operation of recognizing the voice signal, the visual signal, and the RF signal is not limited to an operation carried out in order and is not limited to order shown in the drawing. According to an embodiment of the disclosure, the operation of identifying the signal type is performed at least simultaneously, or order may be adjusted variably according to the kind of an electronic device, a characteristic, setting or the like.

In an embodiment, after operations 715 and 717, operation 511, operation 513 and operation 515 disclosed in FIG. 5 may be executed in order, or operation 511, operation 517, operation 519 and operation 515 disclosed in FIG. 5 may be executed in order. In detail, at least one of the audio module 280, the camera module 291, and the RF module 229 is used to receive a signal including content information that is being executed by the external electronic device 410, and decode the received signal. Thereafter, as explained in FIG. 5, the processor 210 may identify whether virtual reality content is present in content information. And, in response to the virtual reality content being present, the processor 210 may scan and execute the virtual reality content. And, in response to the virtual reality content not being present, the processor 210 may convert content into virtual reality content and execute the converted virtual reality content. However, it is not limited to this.

Figure 8:
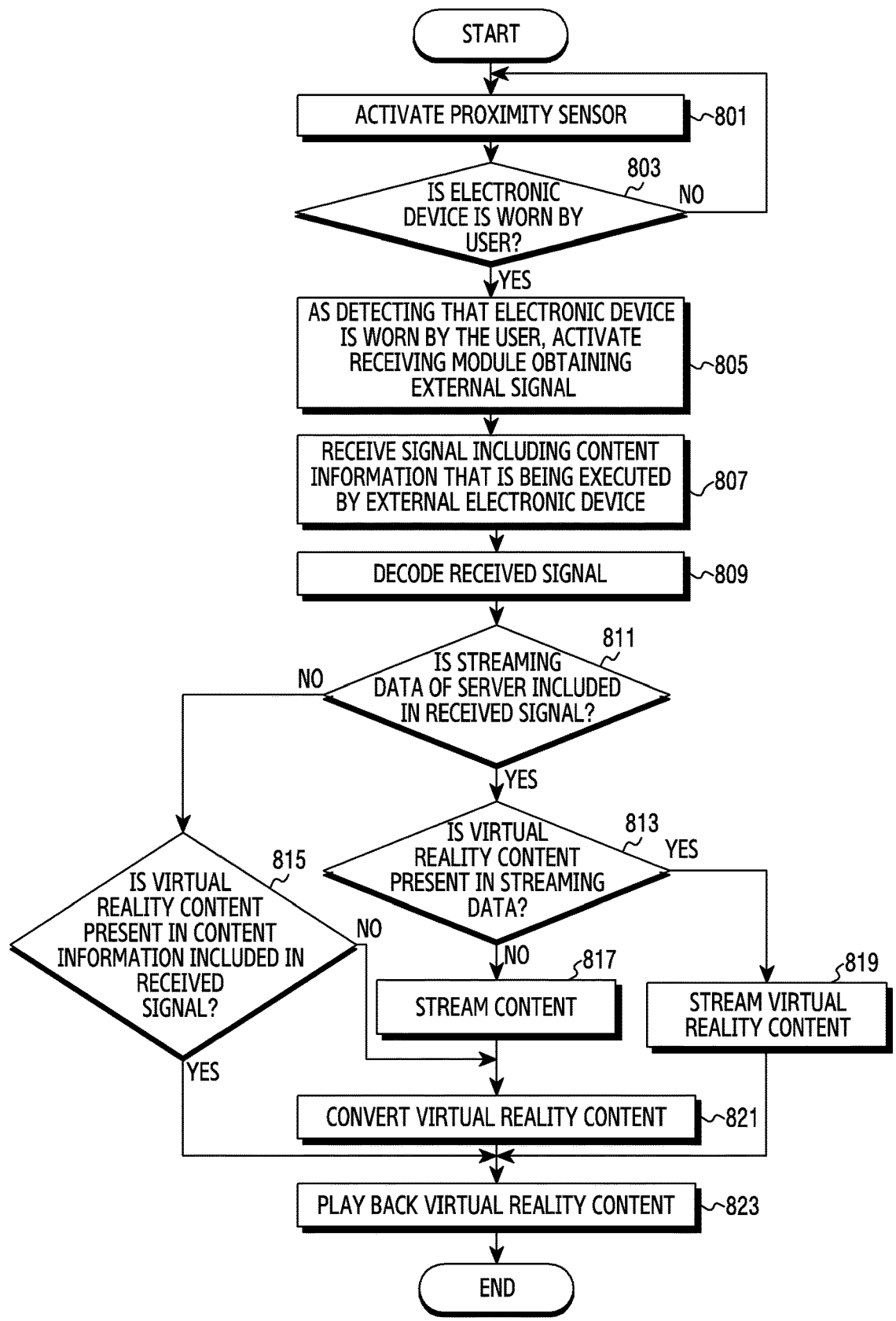
FIG. 8 is a flowchart explaining a method for playing back content according to a content source according to another embodiment of the disclosure.

FIG. 8 is a flowchart explaining a method for playing back content according to a content source according to another embodiment of the disclosure.

Referring to FIG. 8, in an embodiment, content transmitted by the external electronic device 410 may be content stored within the external electronic device 410, or be content forwarded by the server 420 in real time in a streaming scheme, or be live broadcast content. However, the technological spirit of the disclosure is not limited to this.

Operation 801 to operation 809 are the same as operation 501 to operation 509 explained in FIG. 5 and thus, a detailed description is omitted.

In operation 811, in an embodiment, the processor 210 may decode a received signal, and identify whether streaming data of the server 420 is included in the received signal.

In operation 813, in an embodiment, in response to the streaming data of the server 420 being present in the received signal, the processor 210 may identify whether at least one virtual reality content is present in the streaming data.

In operation 819, in an embodiment, in response to the virtual reality content being present in the streaming data, the processor 210 may stream at least one virtual reality content. In this case, the processor 210 may send a streaming data transmission request to the server 420. Subsequently, in operation 823, the processor 210 may play back the virtual reality content.

In detail, in an embodiment, the server 420 may be coupled with the electronic device 201 through the network 162. In response to receiving a request for playing back, by the electronic device 201, content which is being played back by the external electronic device 410 from the external electronic device 410 or the electronic device 201, the server 420 may stop streaming to the external electronic device 410, and convert streaming data, wherein the streaming data may be played back by the electronic device 201, and stream the content to the electronic device 201. However, it is not limited to this, and the electronic device 201 may receive the streamed content from the server 420 in various schemes.

In operation 817, in an embodiment, in response to the virtual reality content not being present in the streaming data, the processor 210 may stream at least one content.

In operation 821, in an embodiment, the processor 210 may convert the content into virtual reality content. In an embodiment, though not illustrated in the drawing, the electronic device 201 may include a virtual reality content conversion module. The virtual reality content conversion module may convert the content into the virtual reality content (three-dimensional content).

In an embodiment, the virtual reality content conversion module grants a sense of depth to a two-dimensional image, to provide a three-dimensional image. The virtual reality content conversion module splits a frame of video data of the two-dimensional image into a block of a specific size, and selects a block being most similar with a specific block of a current frame among blocks of previous frames. The virtual reality content conversion module obtains a motion vector by split block of the current frame, and synthesizes the selected blocks, to provide a new frame. But, the disclosure is not limited to this, and the virtual reality content conversion module may use composition information of a frame to provide a depth map, wherein a sense of depth is granted to an image, and use this to provide a new frame as well.

In an embodiment, the virtual reality content conversion module identifies any one of a new frame and a current frame as a left eye image and identifies the remnant frame as a right eye image, or uses the new frame and the current frame to newly provide the left eye image and the right eye image. The virtual reality content conversion module provides a frame of a three-dimensional format, wherein the left and right images are all included in one frame, and sends this to the display 260. The display 260 outputs the left eye and right eye images included in a frame whose brightness is compensated, alternately by the unit of $1/120$ seconds. However, the virtual reality content conversion module is not limited to this, and may use various methods to convert two-dimensional content into three-dimensional content.

In operation 823, the processor 210 may play back the converted virtual reality content.

In operation 815 and operation 823, in an embodiment, in response to the streaming data of the server 420 not being included in the received signal, the processor 210 may identify whether data or packet corresponding to virtual reality content is included in at least part of content information included in the received signal. In response to the streaming data of the server 420 not being present, the received content information may be content stored within the external electronic device 410 or be live broadcast content. In an embodiment, the processor 210 may play back the scanned virtual reality content, or convert the scanned two-dimensional content into three-dimensional content to play back the three-dimensional content.

In an embodiment, in response to the received virtual reality content being the content stored within the external electronic device 410 or being the live broadcast content, the electronic device 201 and the external electronic device 410 may apply a mirroring technology.

In an embodiment, the mirroring technology is a technology for sharing and handling screen data between devices with display units. For example, the mirroring technology allows to be able to share and use screen data between personal computers. Also, the mirroring technology is being widely developed to be applied to all electronic devices capable of outputting a screen through a portable computer such as a laptop computer, a netbook computer, a tablet personal computer (PC) or the like, a portable terminal such as a smart phone or portable digital assistants (PDA), a display unit such as television (TV), etc. The mirroring technology may be applied to a plurality of electronic devices, to provide a mirroring service capable of sharing a screen and allowing to perform mutual remote control. A technology for providing the mirroring service includes Display as a service (Daas), digital living network alliance (DLNA), AirPlay and Miracast. The Airplay and the Miracast all may not only show general multimedia content on a screen of a television through WiFi, but also realize a full mirroring function. For example, in response to a user playing a game, the television may become a display screen, and the smart phone may be used like a handle. However, it is not limited to this.

Figure 9:
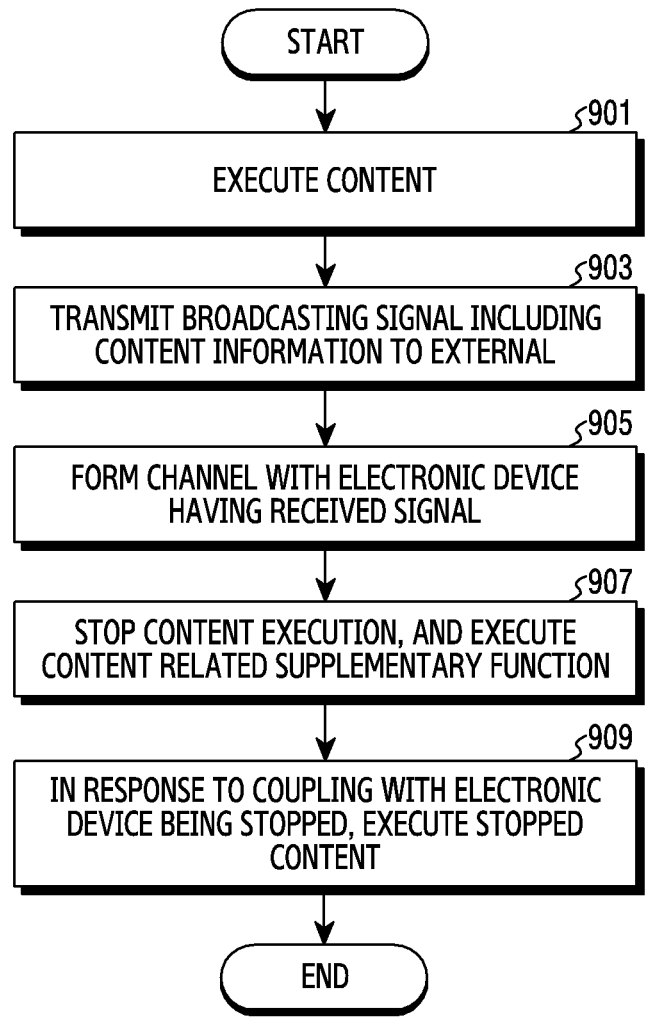
FIG. 9 is a flowchart explaining an operation of an external electronic device according to an embodiment of the disclosure.

FIG. 9 is a flowchart explaining an operation of an external electronic device according to an embodiment of the disclosure.

Figure 10:
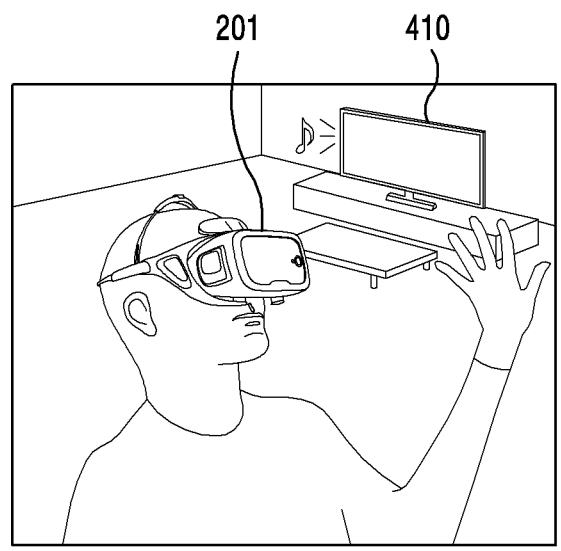
FIG. 10 is an example diagram explaining a method for continuously playing back content according to an embodiment of the disclosure.

FIG. 10 is an example diagram explaining a method for continuously playing back content according to an embodiment of the disclosure.

FIG. 9 and FIG. 10 explain an operation of the external electronic device and an operation of the electronic device thereof, in response to a user wearing the electronic device 201 to execute content. Referring to FIG. 9 and FIG. 10, in operation 901, in an embodiment, the external electronic device 410 executes content. The content is content provided in a streaming format by the server 420 or stored within the external electronic device 410. The content may be virtual reality content, and may include an event, etc. linked with the virtual reality content in part of the content. However, it is not limited to this.

In operation 903, in an embodiment, the external electronic device 410 may advertise information (for instance, identification information, capability information, state information, information on a preferred communication scheme, communication coupling information, etc.) on the external electronic device 410, and/or content information. For example, the external electronic device 410 may process advertising information in an advertising packet form, to broadcast to the external through a Bluetooth Low Energy (BLE) communication unit. However, it is not limited to this.

In an embodiment, the external electronic device 410 cannot know a communication scheme supported by the electronic device 201 and thus, may broadcast advertising information through a plurality of communication schemes as well. For example, in response to the external electronic device 410 including a speaker and a BLE communication unit, the external electronic device 410 outputs a sound signal into which the advertising information is inserted, to the external through the speaker and at the same time, process the advertising information in an advertising packet form to broadcast to the external through the BLE communication unit. However, it is not limited to this.

On the other hand, although not illustrated in the drawing, in an embodiment, the electronic device 201 may automatically scan the external electronic device 410 in response to a specific event occurring. For example, the electronic device 201 may sense the occurrence of a specific event related with device scan. In an embodiment, the specific event may be an event of triggering the scanning of the external electronic device 410. For example, the specific event may be, but not limited to, an event in which a user wears the electronic device 201.

In an embodiment, the electronic device 201 may convert at least one receiving module of an inactive state for communicating with the external electronic device 410, into an active state, on the basis of the occurrence of a specific event. That is, in an embodiment, the electronic device 201 may convert at least one of the RF module 229, the audio module 280, and the camera module 291 into the active state. In an embodiment, the electronic device 201 may scan the external electronic device 410 through the activated receiving module. That is, in an embodiment, the electronic device 201 may receive information on the external electronic device 410 broadcasted by the external electronic device 410, content information, and the like, through the activated receiving module.

In operation 905, in an embodiment, the external electronic device 410 may form a communication link (channel) transmitting and/or receiving data with the electronic device 201. At this time, the communication link may be formed by using the same communication scheme as the communication scheme of receiving the advertising information broadcasted by the external electronic device 410 as well, and may be formed by using a communication scheme (out of band) different from the communication scheme of receiving the advertising information as well. For example, in response to the electronic device 201 receiving the advertising information broadcasted by the external electronic device 410 through BLE communication, the electronic device 201 may form the communication link in the same BLE communication scheme as well, and may form the communication link in a different WiFi Direct communication scheme as well. However, it is not limited to this.

On the other hand, in an embodiment, the communication link may be a virtual communication link of a non-coupling scheme of transmitting and/or receiving an advertising packet through a mutual scanning between the electronic device 201 and the external electronic device 410 as well, and may be a communication link of a coupling scheme in which a session is formed through a coupling request of the electronic device 201 as well.

In an embodiment, the external electronic device 410 may form a Bluetooth communication link, a WiFi communication link or the like, by exchanging coupling information (for instance, an SSID, an IP address, a MAC address, a channel number, a security key, a BT address, a product name, profile information, etc.) necessary for communication link forming with the electronic device 201 through an advertising channel. However, it is not limited to this.

In an embodiment, the external electronic device 410 may provide content information to the electronic device 201 through the communication link.

In operation 907, in an embodiment, as shown in FIG. 10, after the external electronic device 410 is coupled with the electronic device 201 and provides content information, the external electronic device 410 may stop content that is being executed, and execute a supplementary function related with the content. For example, in response to content which is being executed by the external electronic device 410 being continuously executed by the electronic device 201, the external electronic device 410 may perform a speaker function of supporting a sound of the content executed by the electronic device 201. That is, while the content is executed by the electronic device 201, the external electronic device 410 may perform a speaker role. However, the supplementary function execution of the external electronic device 410 is not limited to this, and may support the electronic device 201 in various schemes.

On the other hand, in operation 907, in another embodiment, the external electronic device 410 may power off without executing the content related supplementary function. However, it is not limited to this.

On the other hand, in operation 907, in a further embodiment, the external electronic device 410 may keep executing content which is being executed, or temporally pause the content which is being executed. In this case, the electronic device 201 may execute content linked with the content which is being executed by the external electronic device 410. For example, the external electronic device 410 may pause for a moment a football image which is being executed, and the electronic device 201 may execute a highlight image related with the football image.

In operation 909, in an embodiment, in response to a user stopping the using of the electronic device 201, the external electronic device 410 stops a communication link formed with the electronic device 201, and stops coupling with the electronic device 201. In an embodiment, the external electronic device 410 may again execute content that has been stopped in response to the coupling with the electronic device 201 being stopped. According to an embodiment of the disclosure, the external electronic device 410 may obtain information on playback degree, time, position, etc. of content which is played back by the electronic device 201 from the electronic device 201 and, in response to the coupling with the electronic device 201 being stopped, perform playback of the content in a corresponding position.

According to an embodiment of the disclosure, in response to a user not wearing the electronic device 201, the electronic device 201 may obtain a non-worn state of the electronic device 201, and the electronic device 201 may stop the playback of the content which is being played back by the electronic device 201, and the external electronic device 410 may keep performing the playback of the content. However, it is not limited to this, and the external electronic device 410 may execute other content or may be set as a wait screen, etc.

Figure 11:
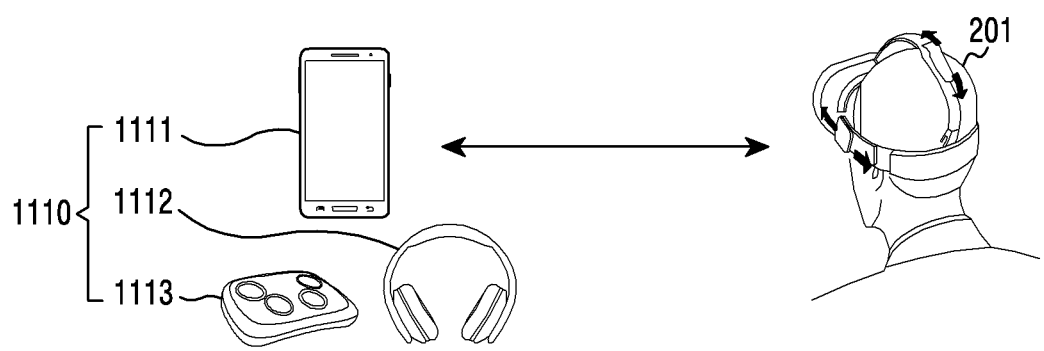
FIG. 11 is a conceptual diagram explaining a method for coupling an electronic device and a peripheral electronic device according to another embodiment of the disclosure.

FIG. 11 is a conceptual diagram explaining a method for coupling an electronic device and a peripheral electronic device according to another embodiment of the disclosure.

Referring to FIG. 11, in an embodiment, the electronic device 201 may be coupled with the peripheral electronic device 1110, and obtain a user's input by using the coupled peripheral electronic device 1110. For example, the peripheral electronic device 1110 may include a mobile terminal 1111, a Bluetooth headset 1112, and a controller 1113. However, the technological spirit of the disclosure is not limited to this.

In an embodiment, the peripheral electronic device 1110 may be a display device including a screen as well, and may be an accessory device not including the screen as well.

For example, the peripheral electronic device 1110 described in the specification may include, but not limited to, at least one of a portable phone, a smart phone, personal digital assistants (PDA), a portable multimedia player (PMP), an audio device, an MP3 player, a digital camera, a wireless speaker, a Bluetooth headset, a controller (joystick), or a wearable device.

In an embodiment, the wearable device included in the peripheral electronic device 1110 may include, but not limited to, at least one of an accessory type (e.g., a watch, a ring, a wristlet, an anklet, glasses, or a contact lens), a fabric or clothing integral type (e.g., electronic clothing), or a body-attached type (e.g., a skin pad, a tattoo or the like).

In an embodiment, the peripheral electronic device 1110 may be an accessory type device capable of assisting a function of the head-mounted electronic device 201.

Figure 12:
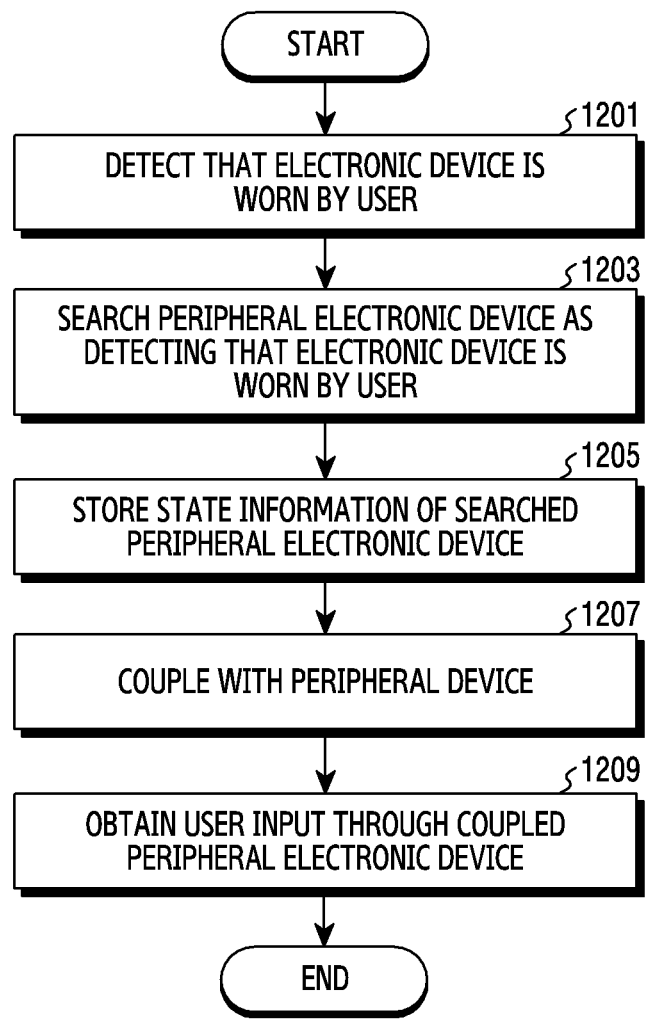
FIG. 12 is a flowchart explaining a method for coupling an electronic device and a peripheral electronic device according to another embodiment of the disclosure.

FIG. 12 is a flowchart explaining a method for coupling an electronic device and a peripheral electronic device according to another embodiment of the disclosure.

Referring to FIG. 12, in operation 1201, in an embodiment, the processor 210 detects that the electronic device 201 is worn by the user. A detailed description has been made in operations 501, 503 of FIG. 5 and thus, is omitted.

In operation 1203, in an embodiment, as detecting that the electronic device 201 is worn by the user, the processor 210 scans the peripheral electronic device 1110. In an embodiment, as detecting that the electronic device 201 is worn by the user, the processor 201 scans the peripheral electronic device 1110. The processor 210 senses the presence of the nearby present peripheral electronic device 1110 by using a probe request, a probe response, broadcasting (advertise data), a scan response, etc.

In an embodiment, the processor 210 sends a service search request to the peripheral electronic device 1110, wherein the processor 210 searches a service supported by the peripheral electronic devices 1110. At this time, the service search request includes service information of the electronic device 201. In detail, the service information includes identification information (ID) of the electronic device 201, a service now in use, service category version information held by the electronic device 201, service category table provision intention information, etc. As such, the electronic device 201 sends a service search request including its own service information, thereby notifying its own service information to its own peripheral electronic device 1110.

In an embodiment, each peripheral electronic device 1110 receiving this service search request analyzes the service information included in the service search request. In response to at least one of the plurality of peripheral electronic devices 1110 being able to support a service requested by the electronic device 201, for instance, a joystick service, the peripheral electronic device 1110 sends the electronic device 201 a service search response including service information which may be provided by the peripheral electronic device 1110. In an embodiment, in response to not supporting a service executable by the electronic device 201 even if having received the service search request, at least one of the plurality of peripheral electronic devices 1110 may not send the service search response.

In operation 1205, in an embodiment, the processor 210 stores state information of the searched peripheral electronic device 1110 in the memory 230. The state information of the peripheral electronic device 1110 may include at least one or more of identification information (ID) of the peripheral electronic device 1110, a currently providable service, and service category version information held by the peripheral electronic device 1110.

In operation 1207, in an embodiment, the processor 210 is coupled with the peripheral electronic device 1110. In detail, in an embodiment, the processor 210 performs a session coupling with the peripheral electronic device 1110, based on the service search response from the peripheral electronic device 1110.

In an embodiment, in response to the plurality of peripheral electronic devices 1110 being possible to support the same service, the processor 210 may first attempt a session coupling in order of receiving service search responses. However, it is not limited to this.

In an embodiment, the processor 210 may preferentially couple only the peripheral electronic device 1110 that provides a main function necessary for the electronic device 201. For example, in response to the Bluetooth headset 1112 being essential to a function performed by the electronic device 201, the processor 210 may preferentially couple the Bluetooth headset 1112 to the electronic device 201. In another embodiment, the processor 210 may couple all of the plurality of peripheral electronic devices 1110 that provide a service available by the electronic device 201. Accordingly, in response to executing an application, a user may immediately use the peripheral electronic device 1110 that provides a service related with the application.

In operation 1209, in an embodiment, the processor 210 may obtain a user's input through the coupled peripheral electronic device 1110. For example, the user may execute an application by using the electronic device 201, and may input a gesture, etc. by using the coupled peripheral electronic device 1110, and the processor 210 may obtain the user's input through the coupled peripheral electronic device 1110. That is, for example, in response to a game application being executed, the user may proceed with input through a coupled controller. In another embodiment, the processor 210 may use the coupled peripheral electronic device 1110, to provide a function of a speaker, etc. to the user. That is, for example, in response to the electronic device 201 being coupled with the Bluetooth headset 1112, the Bluetooth headset 1112 supports sound for the user.

On the other hand, as detecting that the electronic device 201 is worn by the user, the processor 210 may execute an operation of searching the peripheral electronic device 1110, an operation of storing state information of the searched peripheral electronic device 1110, and an operation of coupling with the peripheral electronic device 1110. That is, in operation disclosed in FIG. 12, as wearing the electronic device 201, a user may execute, by the electronic device 201, a service provided by the external electronic device 1110. Accordingly, the user may use content, etc. provided by the electronic device 201, through the peripheral electronic device 1110, by only a motion of wearing the electronic device 201.

On the other hand, though not illustrated in the drawing, in an embodiment, as the electronic device 201 executes a function related with the peripheral electronic device 1110, the processor 210 may activate the peripheral electronic device 1110. In detail, the peripheral electronic device 1110 is not activated immediately after the electronic device 201 and the peripheral electronic device 1110 are coupled, and the peripheral electronic device 1110 may be activated in response to the electronic device 201 executing the function related with the peripheral electronic device 1110. For example, the peripheral electronic device 1110 may be activated in response to an application, content or the like related with the peripheral electronic device 1110 being executed by the electronic device 201.

Figure 13:
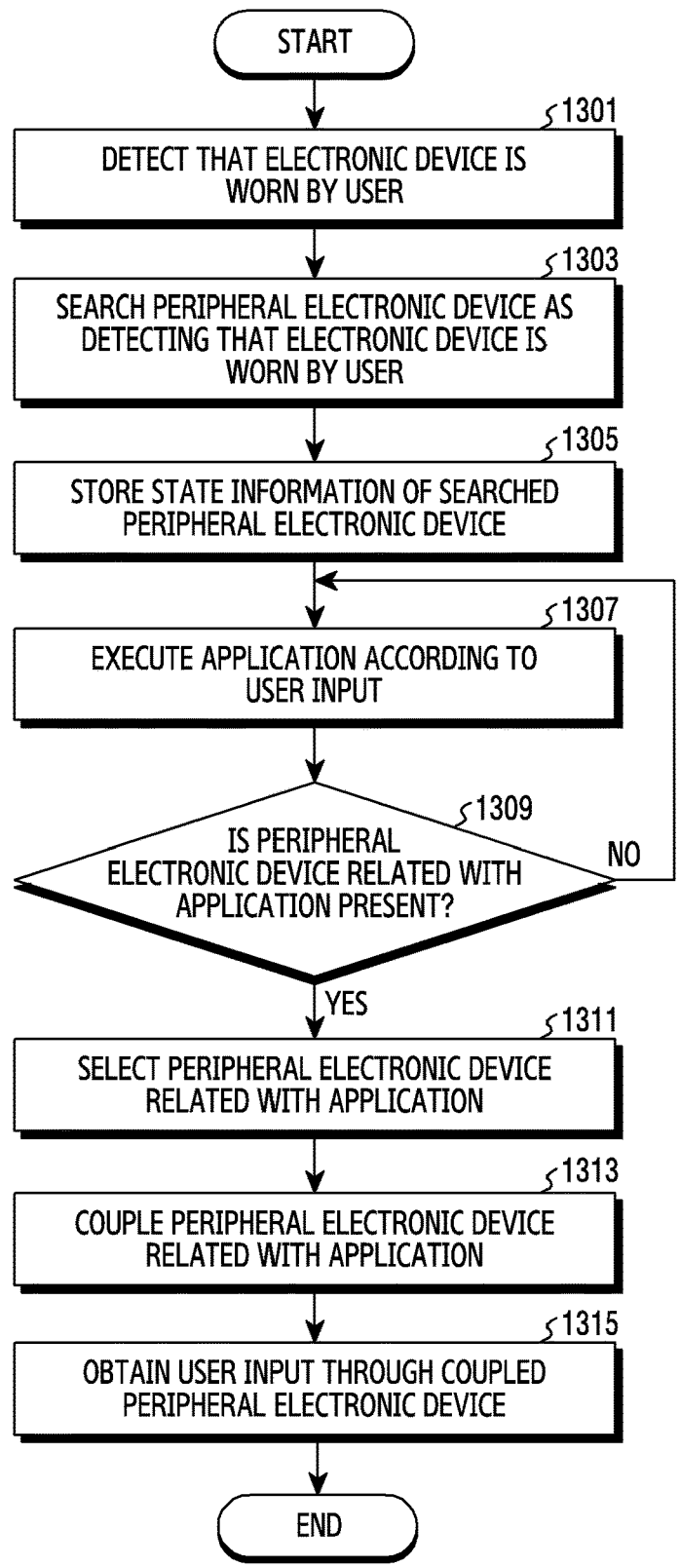
FIG. 13 is a flowchart explaining a method for coupling a peripheral electronic device related with an application and an electronic device according to another embodiment of the disclosure.

FIG. 13 is a flowchart explaining a method for coupling a peripheral electronic device related with an application and an electronic device according to another embodiment of the disclosure.

Referring to FIG. 13, operation 1301 to operation 1305 are the same as operation 1201 to operation 1205 of FIG. 12 and thus, a detailed description is omitted.

In operation 1307, in an embodiment, the processor 210 may execute an application according to a user input. The application may be one of applications embedded in the electronic device 201.

In operation 1309, in an embodiment, as executing the application, the processor 210 may identify whether the peripheral electronic device 1110 related with the application is present. The peripheral device scanning operation related with the application execution operation may be achieved in order or be achieved at the same time. For example, by using state information stored in the memory 230, the processor 210 may identify whether the peripheral electronic device 1110 linkable with the corresponding application is present.

On the other hand, in an embodiment, in response to the peripheral electronic device 1110 related with the executed application not being present, the processor 210 may stop scanning the peripheral electronic device 1110 until another application is executed.

In operation 1311, in an embodiment, in response to the peripheral electronic device 1110 related with the executed application being scanned, the processor 210 may select the peripheral electronic device 1110 related with the application.

In operation 1313, in an embodiment, the processor 210 may couple the selected peripheral electronic device 1110 with the electronic device 201.

In operation 1315, in an embodiment, the processor 210 may obtain a user input through the coupled peripheral electronic device 1110. For example, in response to executing a game application, the processor 201 may scan, select and couple the controller 1113, to obtain a user input. Besides this, in response to executing a music application, the processor 210 may scan, select and couple the Bluetooth headset 1112, to provide sound to a user, and obtain a user input such as increasing or decreasing a volume, etc. However, it is not limited to this, and the electronic device 201 may be coupled with various peripheral electronic devices 1110, to receive a related service.

Figure 14:
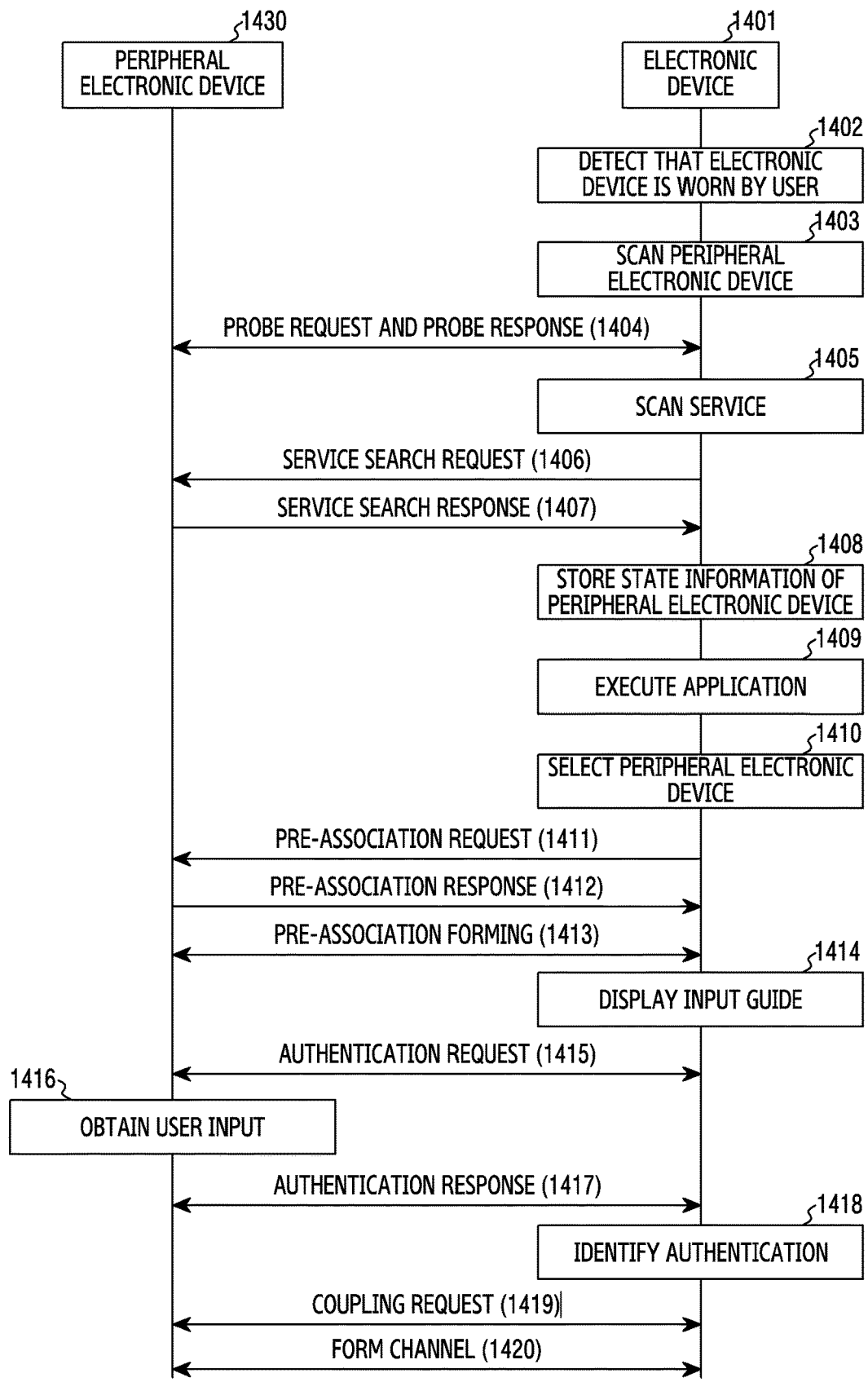
FIG. 14 is a flowchart explaining a system for coupling a peripheral electronic device related with an application and an electronic device according to another embodiment of the disclosure.

FIG. 14 is a flowchart explaining a system for coupling a peripheral electronic device related with an application and an electronic device according to another embodiment of the disclosure.

Referring to FIG. 14, operation 1402 to operation 1410 are the same as operation 1301 to operation 1311 of FIG. 13 and thus, a detailed description is omitted. Operation 1411 to operation 1420 are operations making concrete operation 1313 of FIG. 13.

In operation 1411, in an embodiment, the electronic device 1401 may transmit a pre-association request to the selected peripheral electronic device 1430. The pre-association request and response are steps of previously identifying location information of each device, service information, etc. before coupling between at least two devices. For example, while transmitting the pre-association request, the electronic device 1401 may previously request and grasp location information, etc. of the selected peripheral electronic device 1430 before the coupling. Besides this, while sending the pre-association request, the electronic device 1401 may identify whether the selected peripheral electronic device 1430 is still possible to provide previously stored state information (e.g., a currently providable service).

In operation 1412, the peripheral electronic device 1430 may transmit a pre-association response to the electronic device 1401 correspondingly to the pre-association request. For example, the peripheral electronic device 1430 may provide location information, state information, etc. of the peripheral electronic device 1430 to the electronic device 1401 correspondingly to the pre-association request.

In operation 1413, the electronic device 1401 and the peripheral electronic device 1430 may form a pre-association state. Accordingly, the electronic device 1401 may grasp the location information, the state information, etc. of the peripheral electronic device 1430 forming the pre-association state.

In operation 1414, the electronic device 1401 may display an input guide of the selected peripheral electronic device 1430. Before coupling with the peripheral electronic device 1430, the electronic device 1401 may perform an authentication procedure with the peripheral electronic device 1430 through the input guide. For example, the electronic device 1401 may display an input guide that uses the selected peripheral electronic device 1430, to a user.

In operation 1415, the electronic device 1401 may transmit an authentication request to the selected peripheral electronic device 1430. For example, the electronic device 1401 may transmit an authentication request for coupling with the peripheral electronic device 1430, wherein the peripheral device 1430 may obtain a user's input. Unlike this, the peripheral electronic device 1430 may transmit an authentication request to the electronic device 1401.

In operation 1416, in response to a user inputting at least one touch, etc. by using an input device of the peripheral device 1430, the peripheral electronic device 1430 may obtain the user input.

In operation 1417, as obtaining the user input, the peripheral electronic device 1430 may transmit an authentication response including user input data to the electronic device 1401. Unlike this, the electronic device 1401 may transmit an authentication response to the peripheral electronic device 1430.

In operation 1418, the electronic device 1401 may receive the authentication response, to perform authentication identifying. For example, in response to the user input data being received from the peripheral electronic device 1430 and an operation of the input being executed by the electronic device 1401, the electronic device 1401 may perform the authentication identifying.

In operation 1419, the electronic device 1401 may send a coupling request to the selected peripheral electronic device 1430 according to the authentication identifying. Unlike this, the peripheral electronic device 1430 may send a coupling request to the electronic device 1401. In operation 1420, the coupled electronic device 1401 and peripheral electronic device 1430 may form a channel. Accordingly, the electronic device 1401 may obtain a user input by using the peripheral electronic device 1430, and execute content, etc. according to the user input.

A method according to various embodiments of the disclosure may include detecting that the electronic device is worn by the user, and in response to the detection, obtaining content from an external electronic device, and as obtaining the content from the external electronic device, executing the obtained content.

In an embodiment, detecting that the electronic device is worn by the user may include activating a proximity sensor operatively coupled with the electronic device, and detecting that the electronic device is worn by the user, using the proximity sensor.

In an embodiment, obtaining the content may include activating the receiving module in response to the detection, and receiving a signal including content information from the external electronic device by using the receiving module.

In an embodiment, the receiving module may include at least one of an audio module, a camera module, and an RF module.

In an embodiment, executing the obtained content may include identifying whether virtual reality content is present in the content information, and in response to the virtual reality content being present in the content information, executing the virtual reality content, and in response to the virtual reality content not being present in the content information, converting the content into virtual reality content.

In an embodiment, executing the obtained content may include identifying whether the content is content streamed from a server.

In an embodiment, executing the obtained content may include, in response to the content being the content streamed from the server, executing the streamed content.

In an embodiment, obtaining the content may be obtaining content that is being executed by the external electronic device.

A method according to various embodiments of the disclosure may include detecting that the electronic device is worn by the user, searching a peripheral electronic device in response to the detection, storing state information of the searched peripheral electronic device, and coupling with the searched peripheral electronic device according to the state information.

In an embodiment, detecting that the electronic device is worn by the user may include activating a proximity sensor operatively coupled with the electronic device, and detecting that the electronic device is worn by the user, using the proximity sensor.

In an embodiment, coupling with the searched peripheral electronic device may include executing an application correspondingly to a user input, identifying whether a peripheral electronic device related with the executed application is present, and in response to the peripheral electronic device related with the executed application being present, coupling with the peripheral electronic device related with the executed application.

In an embodiment, identifying whether the peripheral electronic device is present may be identified on the basis of the state information.

In an embodiment, the peripheral device may be activated as the electronic device executes a function related with the peripheral electronic device.

A method according to various embodiments of the disclosure may include detecting that the electronic device is worn by the user, searching a peripheral electronic device in response to the detection, coupling with the searched peripheral electronic device, and as the electronic device executes a function related with the coupled peripheral electronic device, activating the coupled peripheral device.

The disclosure has been now described mainly on preferred embodiments thereof. A person having ordinary skill in the art to which the disclosure pertains would be able to understand that the disclosure can be implemented in a modified form within a scope not departing from a substantial characteristic of the disclosure. Therefore, the disclosed embodiments should be taken into consideration in a descriptive aspect, not in a restrictive aspect. The scope of the disclosure is presented in claims, not in the above-mentioned description, and it would have to be construed that all differences of a scope equivalent thereto are included in the disclosure.

What is claimed is:

1. A head-mounted electronic device comprising:
one or more sensors comprising a proximity sensor;
one or more receivers; and
a processor,
wherein the processor is configured to:
activate the proximity sensor, wherein the proximity sensor is configured to sense proximity of a user's head;
detect, using the proximity sensor, whether the head-mounted electronic device is worn by a user;
in response to the detection of a worn state of the head-mounted electronic device, without a separate user input, activate at least one of the one or more receivers and receive an external signal from an external electronic device using the receivers, wherein the external signal comprises content information that is being executed by the external electronic device;
identify whether the content information being executed by the external electronic device comprises content streamed from a server;
based on identifying that the content information comprises content streamed from a server, connect to the server to receive the streamed content and execute the streamed content received from the server;
based on identifying that the content information does not comprise content streamed from the server:
identify whether the content information comprises virtual reality content, and
convert content obtained from the external signal into virtual reality content and execute the converted virtual reality content, based on identifying the content information as comprising no virtual reality content.

2. The head-mounted electronic device of claim 1, wherein the one or more receivers comprises at least one of an audio receiver, a camera, or an RF receiver.

3. A head-mounted electronic device comprising:
one or more sensors comprising a proximity sensor;
a memory; and
a processor,
wherein the processor is configured to:
- activate the proximity sensor, wherein the proximity sensor is configured to sense proximity of a user's head;
- detect, using the proximity sensor, that the head-mounted electronic device is worn by a user;
- search for a peripheral electronic device in response to the detection;
- receive and store, in the memory, service information currently providable by a peripheral electronic device identified by the search;
- execute an application;
- identify whether a peripheral electronic device linkable with the executed application is present, based on the service information currently providable by the peripheral electronic device;
- in response to the peripheral electronic device not being present, stop searching for the peripheral electronic device until another application is executed;
- in response to the peripheral electronic device being present:
  - establish communicative coupling with the peripheral electronic device;
  - activate the coupled peripheral electronic device as the head-mounted electronic device executes a function related with the peripheral electronic device; and
  - obtain user input through the activated peripheral electronic device.

4. A method of operating a head-mounted electronic device, the method comprising:
- activating a proximity sensor, wherein the proximity sensor is configured to sense proximity of a user's head;
- detecting, using the proximity sensor, whether the head-mounted electronic device is worn by a user;
- in response to the detection of a worn state of the head-mounted electronic device without a separate user input, activating at least one of one or more receivers and receiving an external signal from an external electronic device using the receivers, wherein the external signal comprises content information that is being executed by the external electronic device;
- identifying whether the content information being executed by the external electronic device comprises content streamed from a server;
- based on identifying that the content information comprises content streamed from the server, connecting to the server to receive the streamed content and executing the streamed content received from the server;
- based on identifying that the content information does not comprise content streamed from the server:
  - identifying whether the content information comprises virtual reality content,
  - converting the content into virtual reality content and executing the converted virtual reality content, based on identifying the content information as comprising no virtual reality content.

5. The method of claim 4, wherein the one or more receivers comprises at least one of an audio receiver, a camera, or an RF receiver.

\* \* \* \* \*